US012791482B2

(12) United States Patent
Herzog et al.

(10) Patent No.: US 12,791,482 B2
(45) Date of Patent: Nov. 10, 2026

(54) METHOD AND SYSTEM FOR ANALYSING MATERIALS

(71) Applicant: Tailorlux GmbH, Münster (DE)

(72) Inventors: Tobias Herzog, Münster (DE); Steffen Driever, Münster (DE); Antonio Lorusso, Münster (DE); Beata Malysa, Münster (DE); Helge Uthmann, Münster (DE); Dario Porchetta, Münster (DE)

(73) Assignee: Tailorlux GmbH, Munster (DE)

( * ) Notice: Subject to any disclaimer, the term of this patent is extended or adjusted under 35 U.S.C. 154(b) by 234 days.

(21) Appl. No.: 17/909,464

(22) PCT Filed: Mar. 5, 2021

(86) PCT No.: PCT/EP2021/055690

§ 371 (c)(1),
(2) Date: Sep. 6, 2022

(87) PCT Pub. No.: WO2021/176097

PCT Pub. Date: Sep. 10, 2021

(65) Prior Publication Data

US 2023/0116072 A1 Apr. 13, 2023

(30) Foreign Application Priority Data

Mar. 6, 2020 (GB) ..................................... 2003344

(51) Int. Cl.
*G01N 21/64* (2006.01)
*B29B 17/02* (2006.01)
(Continued)

(52) U.S. Cl.
CPC ......... *G01N 21/6456* (2013.01); *B29B 17/02* (2013.01); *G01J 3/2823* (2013.01);
(Continued)

(58) Field of Classification Search
CPC ....... G01N 21/6456; G01N 2021/6417; G01N 2021/6439; G01N 2201/129; G01N 21/64;
(Continued)

(56) References Cited

U.S. PATENT DOCUMENTS 5,329,127 A * 7/1994 Becker ...................... C08F 2/44 235/491
6,091,491 A * 7/2000 Chisholm ........... C09B 67/0033 356/402
(Continued)

FOREIGN PATENT DOCUMENTS

WO 2017/019337 A1 2/2017
WO 2018/010736 A1 1/2018
(Continued)

OTHER PUBLICATIONS

Erni-Cassola, et al., " Lost, but found with Nile Red: A novel method for detecting and quantifying small microplastics (1 mm to 20 μm) in Environmental Samples," Environ. Sci. Technol., 2017, 51, all enclosed pages cited.
(Continued)

*Primary Examiner* — Michelle M Iacoletti
*Assistant Examiner* — Maher Yazback

(57) ABSTRACT

Methods and systems for analysing products comprising marked materials and marking and tracking such materials are provided. A method of quantifying the proportion of a marked material comprising luminescent markers in a product comprises (i) obtaining a composite signal associated with the product, the composite signal including spectroscopic data and imaging data collected from the product, the spectroscopic and imaging data associated with a luminescent signal of the one or more luminescent markers in the marked material; (ii) identifying the marked material based on spectroscopic data associated with the one or more
(Continued)

luminescent markers; (iii) quantifying the proportion of the marked material that is present in the product based at least in part on said imaging data of the composite signal, wherein said quantifying is based at least in part on the relative positions of and/or the number of luminescent markers detected in each image of the product.

17 Claims, 4 Drawing Sheets

(51) Int. Cl.
*G01J 3/28* (2006.01)
*G01J 3/44* (2006.01)

(52) U.S. Cl.
CPC ..... *G01J 3/4406* (2013.01); *B29B 2017/0203* (2013.01); *B29B 2017/0279* (2013.01); *B29B 2017/0282* (2013.01); *G01N 2021/6417* (2013.01); *G01N 2021/6439* (2013.01)

(58) Field of Classification Search
CPC ............ B29B 17/02; B29B 2017/0203; B29B 2017/0279; B29B 2017/0282; G01J 3/2823; G01J 3/4406; G01J 3/0248; G01J 3/2803; G01J 2003/2826; Y02W 30/62
See application file for complete search history.

(56) References Cited

U.S. PATENT DOCUMENTS

2003/0021998 A1* 1/2003 Hubbard ............ G01N 21/6428 252/645
2007/0119949 A1* 5/2007 Hattersley .......... G06K 19/0614 235/468
2008/0190819 A1* 8/2008 Schlummer ............... B03B 5/44 209/172.5
2012/0010345 A1* 1/2012 Edler .................... C09C 1/3676 977/773
2012/0202192 A1 8/2012 Moshe et al.
2013/0193346 A1* 8/2013 Justel ...................... G01N 21/64 252/301.36
2015/0050548 A1* 2/2015 Meissner ............ H01M 50/121 209/567
2015/0068955 A1* 3/2015 Baque ...................... B07C 5/342 252/301.36
2017/0210901 A1* 7/2017 Langhals ................ B07C 5/342
2019/0130560 A1* 5/2019 Horowitz ............... G06V 10/82
2019/0204290 A1* 7/2019 Soyemi .............. G01N 33/2882
2019/0329297 A1* 10/2019 Moesslein .......... C09K 11/7769
2020/0236281 A1* 7/2020 Arai .......................... G06T 7/70
2020/0326281 A1* 10/2020 Krieg ..................... F16F 15/145
2021/0117632 A1* 4/2021 Braumandl .............. G06K 1/00
2022/0291127 A1* 9/2022 Moesslein ............ B42D 25/387
2022/0339673 A1* 10/2022 Mößlein ............... B07C 5/3412
2023/0192416 A1* 6/2023 Horowitz .................. B07C 5/00 700/223
2024/0078520 A1* 3/2024 Alon ...................... G06Q 10/30

FOREIGN PATENT DOCUMENTS

WO 2018/046066 A1 3/2018
WO 2018/153411 A1 8/2018
WO 2020028288 A1 2/2020
WO 2020028288 A9 3/2021

OTHER PUBLICATIONS

Combined Search and Examination report from corresponding British application No. GB 2003344.5 mailed Apr. 23, 2020, all enclosed pages cited.
Invitation to Pay Additional Fees for corresponding PCT application No. PCT/EP2021/055690 mailed Aug. 13, 2021, all enclosed pages cited.
International Search Report and Written Opinion for corresponding PCT application No. PCT/EP2021/055690 mailed Jun. 22, 2021, all enclosed pages cited.

* cited by examiner

METHOD AND SYSTEM FOR ANALYSING MATERIALS

This application is a U.S. National Stage Entry Application of PCT/EP2021/055690 filed Mar. 5, 2021, which claims priority to British patent application no. GB 2003344.5 filed Mar. 6, 2020, the disclosures of which are incorporated herein by reference in their entirety.

The present invention relates to analysing mixtures of materials containing luminescent markers. In particular, the present invention relates to quantifying the proportion of a marked material that is present in a product comprising a mixture of one or more materials.

In industries where a final product or material for a downstream production process relies on materials obtained from external sources, it is a significant problem to monitor and verify that the material that is provided is of the quality that is specified or derives from a particular specified source. This is relevant for controlling the physical quality of materials but also for meeting a growing demand for knowing whether a material is ethically sourced, even where a material itself is substantially physically the same. For example, it may be desirable to know that materials such as natural fibrous materials like fabrics are derived from organic sources or that the raw materials were ethically grown and processed in terms of labour and environmental concerns. Equally, it is increasingly a desire of consumers, and consequently suppliers, to make use of recycled materials such as recycled plastics and to avoid single use materials. However, without detailed scientific analysis or constant monitoring of the entire supply chain, it may not be possible for end consumers or retailers to physically verify the source of the raw materials used in a product, or whether the materials that are reported as being used are in fact present in the stated quantities. For example, where a material has been blended with cheaper or inferior material it may not be immediately apparent without detailed analysis. In addition, in verifying whether a material that is otherwise physically the same is derived from a particular source, for example for ethical considerations, it may not be possible at all to physically distinguish the materials themselves. Therefore, there is a need to be able to verify the source of materials without the burden and expense of constant supply chain monitoring, which in cases where supply chains extend around several different countries, may not be practical.

One way to control the source of a material is to place markers in the material that can be detected at a later stage and used to verify the origin of the material. For example, luminescent markers having a unique spectral signature may be added to a material at an early stage of processing and can be added at sufficiently low concentration to not affect the properties of the material. Such markers can then be detected at a later stage to verify the presence of the marked material. However, while this may be used to verify the presence of a material of a particular origin, blending may also be used to dilute the amount of the desired material with a cheaper and inferior or otherwise undesirable material. Therefore, it is also desirable to not only identify the presence of a marked material, but to verify the proportion of the marked material that is present.

The intensity of the luminescent signal detected from luminescent markers in a material may provide an indication of the concentration of the luminescent marker, which may be used to infer the concentration of the marked material. However, where a marked material is blended with other materials, for example to dilute the marked material or to change the material's properties such as its colour, changes in the background spectrum due to absorption or reflection of the materials may introduce errors in determining how much of the marker is present in the material due to overlapping signals. For example, where a product comprises a mixture of a marked material and a further material that has been blended with the marked material, the identity of the further material that is used to dilute the marked material may not be immediately apparent, but depending on the identity of the further material and it's background spectrum, it may have a detrimental impact on the reliability of a quantification measurement. For instance, different spectra may be obtained depending on whether a marked fibrous material such as cotton fibres is blended with non-marked cotton, or physically different materials such as polyester fibres like PET. Equally, where a marked material is processed to change its properties such as by adding pigments to colour the material or other functional additives, as is common in fabric based products such as garments or moulded plastic products, such additives may have a significant effect on spectra obtained from the product. In addition, absolute intensity at a wavelength associated with a particular luminescent marker may vary based on the specific setup and arrangement of the spectrometer used, for example the distance of the detector from the sample.

It has been found that, by using imaging data that relates to the positions of markers in an image of the product in a quantification measurement, the effect of unknown materials that have been mixed with the marked material or differences in absolute intensity on the analysis may be reduced or avoided, as while such differences may affect the background of spectroscopic data, the positions and quantity of luminescent markers is largely unaffected. In this way, using imaging data and the relative positions of and/or the number of luminescent markers detected each image of the product can itself provide a way to improve the accuracy of quantification measurements.

Thus, an aspect provides method of quantifying the proportion of a marked material that is present in a product, wherein the product comprises a mixture of one or more materials and the marked material contains one or more luminescent markers, the method comprising:

(i) obtaining a composite signal associated with the product, the composite signal including spectroscopic data and imaging data collected from the product, the spectroscopic and imaging data associated with a luminescent signal of the one or more luminescent markers in the marked material;

(ii) identifying the marked material based on spectroscopic data associated with the one or more luminescent markers;

(iii) quantifying the proportion of the marked material that is present in the product based at least in part on said imaging data of the composite signal, wherein said quantifying is based at least in part on the relative positions of and/or the number of luminescent markers detected each image of the product.

The marked material may be any suitable material that has been marked with one or more luminescent markers. For example, any material for which there is a desire to verify the source of the material downstream in the supply chain to prevent fake or diluted materials being represented as genuine.

In embodiments the marked material comprises or consists essentially of natural fibres, for example plant-based fibres such as cotton, kapok, flax, hemp, jute, rami, sisal, coconut, bamboo or animal-derived fibres such as from sheep's wool, goat hair (mohair), cashmere, tibetan wool, alpaca, llama, vicuña wool, camel hair, angora, horsehair or any other animal hair or natural fibre such as silks including mulberry silk or wild silk (tussah silk), feathers such as down or duck feathers. The marked material may comprise or consist essentially of synthetic fibres, for example polymeric fibres including polymers such as polyester, polyamide, aramid, polyvinyl chloride, polyolefin, polyvinylidene chloride, polyvinyl acetate, or copolymers such as modacrylic, polyurethanes or elastanes. In embodiments the marked material may include mixtures of two or more of the above fibres. In preferred embodiments, the marked material comprises or consists essentially of cotton fibres.

The marked material may comprise or consist essentially of natural fibres derived from a particular source, for example organic natural fibres such as organic cotton, or may comprise fibres derived from a particular recognised source or country.

The marked material may comprise or consist essentially of inorganic-based fibres such as glass fibres, metal fibres or mineral fibres. For example, the marked material may comprise an insulation material such as glasswool or the like, which may be in the form of a fabric.

The marked material may comprise or consist essentially of a plastic material including but not limited to polyesters such as polyethylene terephthalate (PET) or polybutylene terephthalate, polyolefins such as polyethylene or polypropylene, polystyrene, polyvinylchloride (PVC), polyamide, polycarbonate, polyurethane, polyacrylonitriles formaldehyde resins, epoxy resins, or mixtures thereof. In preferred embodiments, the plastic material comprises or consists essentially of polyethylene terephthalate (PET).

In some preferred embodiments the marked material comprises a recycled material. Thus, the marker can be added during a recycling process and subsequently used to verify that a product is derived from recycled materials. The recycled material may comprise any suitable material that has been recycled by reprocessing or treatment or simply reusing or repurposing previously used materials. For example, the recycled material may comprise or consist essentially of materials mentioned previously herein, for example recycled natural fibres such as cotton, recycled plastics such as PET in moulded or fibrous form, recycled glass such as glass wool, recycled paper or cardboard, recycled mineral fibres such as mineral wool. In preferred embodiments, the marked material comprises or consists essentially of recycled cotton or recycled PET.

Thus, in some preferred embodiments the marked material comprises recycled plastic, for example plastics as described previously, which may be in the form of fibres or may be in other forms such as moulded plastic products for example plastic bottles, shredded plastic, flakes or pellets. The recycled plastic may also be in the form of a product stream during processing of the plastic, for example a molten stream or extruded stream of plastic or a flow of particulate material or shredded or flaked material. The recycled plastic or other marked material may comprise a 3D printed material or material for use in 3D printing.

The product comprising the marked material may be any suitable product containing the marked material. In some embodiments, the product is in the form of natural or synthetic fibres, yarn, woven or non-woven fabric made from synthetic or natural fibres, pellets, powder, granulate, extruded material stream such as filament, moulded materials, foams, or a material formed from pulp such as paper or cardboard, or product streams for forming such products or processed material formed from such products, for example shredded or ground materials, or fibres or yarns obtained from fabrics.

While plastics and fibrous materials are mentioned above, any other materials may be marked with luminescent markers as described herein, for example leather, glass, paint, varnish, ink, metals, rubber, liquids such as oil, paint thinner or solvents, or building materials such as wood, concrete, glass wool, windows, insulation material and so on.

The marked material contains one or more luminescent markers. The luminescent markers may be any suitable luminescent compounds that are identifiable spectroscopically and are chemically and physically stable when incorporated into the material to be marked. It will be appreciated that different luminescent compounds will show responses at different wavelengths in the electromagnetic spectrum when analysed. The luminescent markers may comprise luminescent organic compounds, metal-organic complexes and/or inorganic compounds. The luminescent markers may suitably be fluorescent and/or phosphorescent compounds.

Preferably, the one or more luminescent markers comprise one or more inorganic luminescent compounds. The inorganic luminescent compound may comprise an inorganic carrier material doped with one or more metal ions, for example a ceramic material doped with one or more rare earth and/or transition metal ions, or the inorganic luminescent compound may comprise a quantum dot material. Such materials have been found to be particularly chemically inert and resilient as markers, for example able to withstand high temperatures and physical processing of the material and to remain active as effective markers.

In preferred embodiments, the one or more luminescent markers comprise an inorganic carrier material such as a ceramic material doped with one or more ions selected from the group consisting of $In^{+}$, $In^{3+}$, $Sn^{2+}$, $Pb^{2+}$, $Sb^{3+}$, $Bi^{+}$, $Bi^{2+}$, $Bi^{3+}$, $As^{3+}$, $Ce^{3+}$, $Ce^{4+}$, $Pr^{3+}$, $Nd^{3+}$, $Sm^{2+}$, $Sm^{3+}$, $Eu^{2+}$, $Eu^{3+}$, $Gd^{3+}$, $Tb^{3+}$, $Dy^{3+}$, $Ho^{3+}$, $Er^{3+}$, $Tm^{2+}$, $Tm^{3+}$, $Tl^{+}$, $Yb^{2+}$, $Yb^{3+}$, $Ti^{+}$, $Ti^{3+}$, $V^{2+}$, $V^{3+}$, $V^{4+}$, $Cr^{2+}$, $Cr^{3+}$, $Cr^{4+}$, $Cr^{5+}$, $Mn^{2+}$, $Mn^{3+}$, $Mn^{4+}$, $Fe^{3+}$, $Fe^{4+}$, $Fe^{5+}$, $Co^{3+}$, $Co^{4+}$, $Ni^{2+}$, $Cu^{+}$, $Ru^{2+}$, $Ru^{3+}$, $Pd^{2+}$, $Ag^{+}$, $Ir^{3+}$, $Pt^{2+}$, $Zn^{2+}$ and $Au^{+}$.

In preferred embodiments, the one or more inorganic luminescent compounds comprise a halide, oxide, oxyhalide, sulfide, oxysulfide, sulfate, oxysulfate, nitride, siliconitride, selenide, oxynitride, nitrate, oxynitrate, arsenate, borate, phosphide, phosphate, halophosphate, carbonate, aluminate, silicate, halosilicate, oxysilicate, vanadate, molybdate, tungstate, germanate, oxygermanate, stannate or combinations thereof of one or more of the elements Li, Na, K, Ba, Rb, Mg, Ca, Cd, Ce, Cs, Sc, Sr, Se, Y, La, Ti, Zr, Hf, Nb, Ta, Tb, Zn, Gd, Lu, Al, Ga or In, which may be doped with one or more additional metal ions, for example the metal ions described previously.

Luminescent organic compounds may be selected from organic compounds having conjugated systems such as fluorescein derivatives, coumarin derivatives, oxazine derivatives, rhodamine derivatives, lumogens, pyrromethene dye derivatives or other organic compounds showing suitable luminescence. Metal-organic complex compounds may comprise rare earth complexes such as complexes of organic ligands with Eu, Tb, Sm, Nd, Ce, Pr, Dy, Ho, Er, Tm or Yb, or complexes of organic ligands with other metals such as Ru, Cr, Mn, Fe, Co, Ni, Tb or Cu. The organic ligands may comprise ligands having conjugated systems such as acetylacetone (ACAC), dibenzoylmethane (DBM), 4,4,4-trifluoro-1-(2-naphthyl)-1,3-butanedione (TFNB), thenoyltrifluoroacetone (TTFA), bipyridine derivatives, phenanthroline derivatives or other organic complexing ligands.

Preferably the luminescent marker comprises one or more inorganic luminescent compounds as defined herein. Such markers have been found to be stable in marked materials throughout processing of materials, for example under mechanical stress and at high temperatures. Thus, inorganic luminescent markers may be particularly effective in products such as recycled materials that are marked and subsequently processed at high temperatures and stress in reprocessing, extrusion or moulding processes, where the inorganic luminescent markers remain stable as markers in the material. In this way, there is a synergy between the use of inorganic luminescent markers and the marking of recycled materials, and in particular recycled plastic materials that are subject to subsequent extrusion or moulding processes.

In some instances, the product may comprise more than one marked material and consequently more than one unique luminescent marker or combination of markers. For example, the product may contain a mixture of marked recycled cotton with marked recycled PET. Thus, the method may further comprise quantifying the proportion of first marked material and a second marked material that are present in a product, wherein the product comprises a mixture of at least the first and second marked materials and the first and second marked materials each contain one or more luminescent markers.

The present method comprises obtaining spectroscopic data associated with a luminescent signal of the one or more luminescent markers in the marked material. Spectroscopic data as referred to herein may comprise luminescence spectra collected from the product, for example fluorescence or phosphorescence spectra. Spectroscopic data associated with a luminescent signal of the one or more luminescent markers will be understood to refer to spectroscopic data that shows a response from the one or more luminescent markers. Preferably, the spectroscopic data relates to emission or absorption spectra collected in the wavelength range of from 200 to about 3000 nm, for example from about 280 to 1100 nm and/or in the near-IR range from about 780 nm to 2500 nm. Preferably, the spectroscopic data relates to emission or absorption spectra collected in the wavelength range of from 780 nm to 2500 nm. The spectroscopic data may comprise the spectra themselves or may comprise information relating to features of the spectra, such as information representing the presence of particular peaks in the spectra and their intensity. For example, the spectroscopic data may comprise a matrix representing features of the luminescence spectra. In some preferred embodiments, the spectroscopic data may include information relating to the time dependent response of the luminescent marker, for example the luminescence lifetime observed for a luminescent signal from the marker. In some instances, to minimise background interference the luminescent marker may be chosen to provide a luminescent response in a region of the electromagnetic spectrum in which the material being marked does not show a strong signal, or where a particular blend downstream is anticipated for a marked material or a particular additive is anticipated to be added to a marked material, the luminescent marker may be chosen to provide a luminescent response in a region of the electromagnetic spectrum in which the blend or additive does not show a strong signal.

The imaging data associated with a luminescent signal of the one or more luminescent markers suitably comprise images showing the distribution of luminescent markers throughout the material. For example, the imaging data may comprise fluorescence or phosphorescence images in which the one or more luminescent markers can be distinguished as defined spots relative to the background of the image. The imaging data may comprise the images themselves and/or may comprise information relating to the positions of markers in the image, for example coordinates or relative positions and/or numbers of markers detected in an image, such as the number of markers per unit area or unit volume (e.g. per physical unit area or volume or per unit area in terms of image pixels where this is known to relate to a certain area). By using imaging data that relates to the positions and/or numbers of markers in an image of the product in a quantification measurement, the effect of unknown materials that have been mixed with the marked material on the analysis may be reduced or avoided, because while such materials may affect the background of spectroscopic data, the positions and quantity of luminescent markers has been found to be largely unaffected.

Where a product contains luminescent compounds or markers in addition to those present in the marked material, spectroscopic data from a hyperspectral camera can be used to identify the specific markers in the image that are associated with the marked material.

It has been found that inorganic luminescent markers as defined herein may be particularly effective in relation to using imaging data in the present method, as such markers produce well-defined spots of luminescence that can be observed above the background. Thus, there is a synergy between the use of inorganic luminescent markers as described herein and the use of imaging data for quantification methods as described herein.

The spectroscopic and/or imaging data may be collected by any suitable detector, and it will be appreciated that measuring luminescence is generally known to the person of skill in the art. For example, photodiodes or other detectors may be used to measure the emission, across a range of wavelengths, from a sample in response to excitation with electromagnetic energy. The spectroscopic data may in some embodiments be collected by fluorescence spectroscopy. A hyperspectral camera may be used to collect both images and spectroscopic data across a range of wavelengths at the same time.

Part (i) of the method comprises obtaining a composite signal associated with the product, the composite signal including spectroscopic and imaging data collected from the product. Preferably, part (i) of the method comprises obtaining a composite signal associated with the product, the composite signal including spectroscopic and/or imaging data collected from a plurality of different portions of the product. Therefore, a composite signal as referred to herein may preferably relate to a collection of spectroscopic data and/or imaging data relating to a plurality of different portions of the product that is being analysed. The composite signal may be in the form of raw spectra and/or images, a collection of multiple raw spectra and/or images, or may be in the form of information derived from spectra and/or images as described previously. For example, the composite signal may comprise a multidimensional data set representing the features of spectra and/or images collected from the product, and preferably from a plurality of different portions of the product. The composite signal, the spectroscopic data and/or the imaging data may be in the form of a transformed data set, for example a dimensionally reduced data set that may be used for statistical analysis and pattern recognition. For example, the composite signal may comprise a multidimensional data array representing the spectroscopic and/or imaging data, which may be processed using multidimensional data processing and classification methods, which may include supervised or unsupervised multivariate analysis methods such as principal component analysis, linear discriminant analysis, multiple linear regression, cluster analysis or partial least squares methods, random forests, gradient boosting, support vector machines or neural networks. Statistical methods for processing and analysing data are described for example in Gautam et al., EPJ Techniques and Instrumentation, 2, 8 (2015), and Zhou et al., AUTEX Research Journal, Vol. 19, No 2, June 2019.

By using a composite signal comprising data relating to a plurality of portions of the product, analysis may be improved by not only analysing variations (for example in marker intensity or distribution) within an individual spectrum or image, but also taking into account variations between a series of spectra and images taken from a plurality of portions of the same product, which adds a further variable for the quantification step, for example by comparison to reference data.

In particular, a composite signal comprising data relating to a plurality of portions of the product may be used for products that are not completely homogenised during production. For example, where the product comprises a fabric or other fibrous material such as insulating material, the individual fibres are fixed in place during manufacture and it is not certain that the marked fibres will always distribute evenly across the product. In contrast, a product formed from a melt such as a moulded or extruded plastic product is homogenised during processing and may in some cases be analysed by using data from a single measurement that is assumed to be representative of the product as a whole due to the manufacturing process. Thus, in general the methods described herein may preferably comprise methods of quantifying the proportion of a marked material that is present in a product, wherein the product comprises a mixture of one or more materials and the marked material contains one or more luminescent markers distributed inhomogeneously throughout the product, for example where spectra and/or images of the luminescent markers in the product differ between different portions of the product.

In preferred embodiments, the composite signal comprises spectroscopic and/or imaging data relating to at least 3 different portions of the product, preferably at least 10 portions of the product, for example at least 50 portions of the product or at least 100 portions of the product, or even at least 500 or at least 1000 portions of the product.

While it is desirable to mark materials with luminescent markers as uniformly as possible, for example by introducing the markers evenly into a material stream before a homogenising process, in practice there is nonetheless variation in the distribution of markers throughout marked materials. This is particularly the case where further processing or blending of the material is performed by third parties and is therefore out of the direct control of a party marking a material. By obtaining a composite signal comprising data from a plurality of different portions of a product, and using that composite signal for the quantification of the proportion of marked material present, variations in the distribution of luminescent markers in the product may be better accounted for and a more reliable quantification measurement may be achieved.

Obtaining a composite signal associated with the product may comprise any suitable steps of gathering the spectroscopic data and/or imaging data. Thus, obtaining may suitably comprise the step of scanning the product to obtain spectra and/or images or may comprise obtaining spectroscopic and/or imaging data that relates to spectra and images of the product that have previously been collected.

Thus, in some preferred embodiments, obtaining a composite signal associated with the product comprises scanning the product to collect spectroscopic and/or imaging data associated with the luminescent signal of the one or more luminescent markers in the marked material.

Scanning the product may be performed by any suitable method. In some preferred embodiments, the method comprises scanning the product using an in-line detector arranged to scan a process flow of the product, or using a movable detector, for example a handheld detector or a system configured to move a detector over the surface of the product.

An in-line detector may be a static detector configured to scan a process flow as it passes the detector, for example where the detector is configured to collect data over a period of time, for example at pre-determined time intervals, to collect data relating to different portions of the product as it passes the detector. It will be appreciated that the form of the process flow may be in various different forms and may depend on the nature of the marked material and the product. For example, the product and/or marked material may comprise plastic and the process stream may comprise a molten stream of material or a stream through or from an extruder. The process stream may comprise a filament or may comprise natural or synthetic fibres, which may be in a raw form or in the form of yarn or a woven or non-woven fabric. In some instances, the process stream may be a flow of particles, for example a flow of material in the form of pellets, powder, flakes or granulate. In some instances the process stream may be in the form of a suspension of material in a fluid, for example material carried by a gas stream or a liquid stream.

A movable detector may be used to scan a static product or a plurality of portions of a static product, for example a sheet of material such as a fabric or a material in the form of a specific product such as a garment or a moulded plastic product such as a bottle or packaging. A movable detector may be in any suitable form, for example in order to move the detector over the product to scan a plurality of portions of the product. For example, a handheld detector may be used to manually scan and move a detector over the surface of a product, for example for use in scanning products to be provided to consumers such as garments or moulded plastic products. Alternatively, a movable detector may be automated, for example by using robotics to move a detector across the surface of a product such as a sheet of material (e.g. a sheet of fabric or a sheet of plastic). For example, the scanning of a product using a handheld or automated detector may be performed as part of a production line in a factory or performed at any stage on samples taken from a production process or supply chain. A movable detector may also be used to scan a moving product or product stream, for example as described previously, in which case the movable detector may be held static or also moved in addition to the product.

In other preferred embodiments, obtaining a composite signal associated with the product comprises receiving the composite signal from a remote detector that is used to scan the product. Obtaining the composite signal may comprise receiving the composite signal as an electronic communication directly or indirectly from a remote detector, for example receiving the composite signal from a remote detector or receiving the composite signal from a server in communication with the detector. Obtaining the composite signal may comprise obtaining a composite signal that is stored in a local or remote (e.g. stored on a server) computer memory. In some instances, obtaining the composite signal may comprise receiving spectroscopic and/or imaging data and processing the data to obtain the composite signal, for example processing the data to produce a dimensionally reduced data set as described previously. In other embodiments, obtaining the composite signal may comprise receiving a data set relating to the spectroscopic and/or imaging data that has already been processed.

The composite signal may comprise spectroscopic and imaging data as described previously, which may directly correlate or may be at least partially independent. For example, each image to which the composite signal relates may have a corresponding spectrum also included in the composite signal, in particular where both are collected simultaneously, using a hyperspectral camera for example. Alternatively, the images and spectra may be at least partially independent such that some or all of the spectra do not have corresponding images or vice versa, for example where spectra and images are collected independently with differing frequency. Preferably, the composite signal used in the quantification step comprises both spectroscopic and imaging data. By using both spectroscopic data and imaging data in the composite signal, the accuracy and reliability of quantification of marked material in a mixed product may be improved.

The method comprises the step of quantifying the proportion of the marked material that is present in the product based at least in part on said imaging data of the composite signal, wherein said quantifying is based at least in part on the relative positions of and/or the number of luminescent markers detected in each image of the product, as described previously. Suitably, imaging data may be used in which the positions of luminescent markers are largely unaffected by the background or absolute intensity of the marker luminescent signal. Thus, by using imaging data showing the distribution of luminescent markers in the product, the accuracy and reliability of the quantification of the proportion of marked material blended with other materials may be improved.

The method may comprise quantifying the proportion of the marked material that is present in the product based on the composite signal and reference data. The reference data may be associated with one or more reference materials comprising the marked material and may comprise a database of reference data collected from reference materials that comprise the marked material blended in different proportions with various other non-marked materials as well as reference data relating to 100% marked material. For example, the reference data may include reference data collected from a series of reference materials made from a first material that is blended with the marked material in different known amounts. In this way, by comparing the composite signal to the reference data, the proportion of the marked material in the product may be quantified. The reference data may include reference data collected from a plurality of different materials that are each blended with the marked material in different known amounts, where the plurality of materials may each be different to other materials of the plurality of materials, or may also be materials mixed with known additives that may affect the material's luminescent spectrum. For example, the reference data may include reference data collected from reference materials having various dyes or other additives blended with them, where the reference data includes reference data relating to such materials blended with the marked material in known amounts. The reference data may also include reference data relating to materials blended with the marked material to form products in different physical forms as described previously herein, for example reference data relating to the same material in the form of raw fibres, yarn or fabric, or in the form of an extrudate such as a filament or a moulded form such as a plastic bottle or processed streams such as shredded or ground material.

Reference materials may comprise mixtures of the marked material with a material that is analytically the same material as the marked material and only differs in that it is not marked. In addition, reference materials may comprise the marked material blended with a different material. For example, the marked material may comprise cotton, and the reference data may include reference data relating to cotton blended with different amounts of non-marked cotton, other different natural fibres, synthetic fibres such as polyester fibres and so on. Similarly, the marked material may comprise a specific recycled plastic such as recycled PET, and the reference data may include reference data relating to marked recycled PET blended with different amounts of non-marked PET or other plastics.

The reference data may comprise one or more reference signals collected from one or more respective reference materials, where the reference signals are directly or indirectly comparable to the composite signal, for example the reference data may comprise spectroscopic data and/or imaging data and may be in the form of a composite reference signal that comprises spectroscopic data and/or imaging data collected from a plurality of portions of a reference material, as described previously in relation to the composite signal comprising data collected from a plurality of portions of the product. Where a composite reference signal comprising spectroscopic data and/or imaging data collected from a plurality of portions of a reference material is used, inhomogeneity in the spectroscopic or imaging data across portions a marked product can be accounted for. For example, reference data collected from a plurality of portions of a reference material can be used to define a range for the proportion of the marked material in a product, where a single spectrum or image can be categorised as belonging to a particular quantity of marked material irrespective of the variations across the material. In preferred embodiments, a composite signal comprising data collected from a plurality of portions of the product is used in addition to composite reference signal data for the quantification, so that the quantification can be based at least in part on the variation across the product.

Thus, the quantifying step may comprise comparing characteristics of said composite signal associated with the product to said one or more reference signals and, based on the comparison, quantifying the proportion of the marked material that is present in the product. The reference data may comprise processed data, such as a dimensionally reduced data set as described previously, based on collected reference signals.

Comparing characteristics of said composite signal associated with the product to said one or more reference signals may be done in any suitable way, for example by multivariate data processing techniques as described previously or covariance analysis. Suitably, the comparison of the composite signal with one or more reference signals is based at least in part on the relative positions of and/or the number of luminescent markers detected in each image of the product. Thus, the comparison is based on more than the intensity of one or more signals resulting from the luminescent markers. In some instances, both one or more signals resulting from the luminescent markers and the background spectrum not associated with any luminescent marker are used in the comparison. Absolute intensity at a wavelength associated with a particular luminescent marker may vary based on the specific setup and arrangement of the spectrometer used, for example the distance of the detector from the sample, and may vary based on overlapping signals in the background spectrum. In this way, by using imaging data and optionally the background signal in addition to the luminescent marker signal, such effects may be accounted for and a more accurate and reliable quantification may be performed. The background signal may conveniently be accounted for by transforming spectroscopic data relating to the luminescent signal and the background to identify its characteristics statistically, for example by multidimensional data processing and classification methods as described previously.

Suitably, imaging data may be used in which the positions of luminescent markers are largely unaffected by the background or absolute intensity of the marker luminescent signal. Thus, by using imaging data showing the distribution of luminescent markers in the product, the accuracy and reliability of the quantification of the proportion of marked material blended with other materials may be improved.

It will be appreciated that the luminescent markers are present in the marked material in a known concentration that is associated with the identity of the marked material, such that the amount of the marked material in the product may be derived from the amount of luminescent marker detected in the product.

The reference data may not include reference signals such as spectroscopic data or imaging data per se, but may comprise a data analysis model configured to recognise and classify the composite signal to quantify the proportion of the marked material in the product. Thus, the reference data may comprise a pattern recognition element or machine learning element associated with one or more reference signals collected from one or more respective reference materials, for example a pattern recognition or machine learning element trained based on said reference signals, and the quantifying step comprises applying the pattern recognition or machine learning element to the composite signal to quantify the proportion of the marked material that is present in the product. The pattern recognition or machine learning element may be trained or developed using a training set of reference data or signals as described previously. The pattern recognition or machine learning element may be based on an artificial neural network, such as a deep learning neural network, a convolutional neural network or a support-vector machine, configured to classify spectroscopic and/or imaging data in the composite signal in relation to known reference data. In this way, the method may not include a step of directly comparing the composite signal to the reference data such as spectroscopic data or imaging data from a reference material, but may indirectly do so by applying a pattern recognition or machine learning element based on the reference data to the composite signal.

Machine learning or pattern recognition elements described herein may be provided in a number of forms. This may include computer program instructions configured to program a computer processor to operate according to the instructions. The instructions may comprise a finalised machine learning element such that a user may not be able to alter or identify properties associated with the element, or the instructions may be overwritten so that continued use of the machine learning element may enable the code to be updated (so as to further develop the element). As will be appreciated in the context of the present disclosure, the specific nature of the pattern recognition or machine learning element is not to be considered limiting, and may vary depending on the nature of data to be processed. Any suitable system for the provision of a pattern recognition or machine learning element may be utilised.

A machine learning element may for example comprise a neural network. A neural network may include a plurality of layers of neurons, where each neuron is configured to process input data to provide output data. It will be appreciated that any suitable process may be provided by any given neuron, and these may vary depending on the type of input data. Each layer of the network may include a plurality of neurons. The output of each neuron in one layer may be provided as an input to one or more (e.g. all) of the neurons in the subsequent layer. Each neuron may have an associated set of weightings, which provide a respective weighting to each stream of input data provided to that neuron. Each path from a neuron to a neuron may be referred to as 'an edge'. Weightings may be stored at each neuron, and/or at each edge.

Such a neural network may have at least two variables which can be modified to provide improved processing of data. Firstly, a neuron's functionality may be selected or updated. Systems and methods of neural architecture search may be used to identify suitable functionalities for neurons in a network. Secondly, the weightings in the network may be updated, such as to alter priorities of different streams of input and output data throughout the network.

The machine learning element may be trained. For example, training the machine learning element may comprise updating the weightings. A plurality of methods may be used to determine how to update the weightings. For example, supervised learning methods may be used in which the element is operated on input data for which there is a known correct output. That input/output is provided to the machine learning element after it has operated on the data to enable the machine learning element to update itself (e.g. modify its weightings). This may be performed using methods such as back propagation. By repeating this process a large number of times, the element may become trained so that it is adapted to process the relevant data and provide a relevant output. Other examples for training the machine learning element include use of reinforcement learning, where one or more rewards are defined to enable elements to be trained by identifying and utilising a balance between explorative and exploitative behaviour. For example, such methods may make use of bandit algorithms. As another example, unsupervised learning may be utilised to train the machine learning element. Unsupervised learning methods may make use of principal component and/or cluster analysis to attempt to infer probability distributions for an output based on characteristics of the input data (e.g. which may be associated with known/identified outputs).

The specifics of the machine learning element, and how it is trained, may vary, such as to account for the type of input data to be processed. It will be appreciated that different types of machine learning element may be suited to different tasks or for processing different types of data. It will also be appreciated that data may be cast into different forms to make use of different machine learning elements. For example, a standard neural network could be used for processing numerical input data, such as empirical values from obtained measurements. For processing images, convolutional neural networks may be used, which include one or more convolution layers. Numerical data may be cast into image form, such as by using a form of rasterisation which represents numerical data in image form. A standard file format may be used to which the resulting image must adhere, and a convolutional neural network may then be trained (and used) to analyse images which represent the measurements (rather than values for the measurements themselves). Consequently, the specific type of machine learning element should not be considered limiting. The machine learning element may be any element which is adapted to process a specific type of input data to provide a desired form of output data (e.g. any element which has been trained/refined to provide improved performance at its designated task).

The quantification of the proportion of the marked material that is present in the product may provide a particular value of the quantity of the marked material that is present, which may include an estimated confidence level or error in the value. In some preferred embodiments, quantifying the proportion of the marked material that is present in the product comprises indicating that the proportion falls within a range of values. For example, the quantifying may comprise indicating that the product comprises less than a threshold proportion of the marked material, such as less than 100% of the marked material.

Reference data may be collected from reference materials in any suitable way, for example as described previously in relation to obtaining the composite signal. In some embodiments, reference data may be collected during marking of a material, where a material stream is marked with luminescent markers and then subsequently scanned to collect reference data during the marking process, for example using an in-line detector configured to scan the material downstream of the marking process. Reference data may also be collected by marking a material with luminescent markers and following the processing of the material and scanning it after processing by blending with other materials or processing the material into a different form, such as raw fibres into yarn or fabric, or a molten plastic stream into filament, fibres, fabric or moulded products.

The present method may comprise the steps of identifying the marked material based on spectroscopic data associated with the one or more luminescent markers, and based on spectroscopic data collected from the product, automatically selecting reference data associated with one or more reference materials comprising the marked material. Whether the quantification of the proportion of the marked material is performed by direct comparison to reference signals or indirectly by a pattern recognition or machine learning element, the quantification can be improved by identifying the appropriate reference data for a particular product that is being analysed. For example, this may comprise selecting reference data that comprises spectroscopic and/or imaging data relating to the particular materials being analysed for comparison to a composite signal. In the case of a pattern recognition or machine learning element applied to the composite signal this may comprise including a further variable as an input to the pattern recognition or machine learning element or a prompt to select a specific pattern recognition or machine learning element relating to the particular marked material and/or the materials with which the marked material is mixed.

Identifying the marked material may suitably be based on the identity of the one or more luminescent markers by identifying a particular spectroscopic signature associated with the one or more luminescent markers in the marked material, for example detecting a luminescent response at a particular wavelength following irradiation and optionally luminescence lifetime. In particular, a marked material may be identified by the presence of a luminescent marker or combination of luminescent markers that are unique to the marked material. By using a wide range of different luminescent markers, and by using different markers in combination with each other and in different proportions, a large number of unique signatures may be generated from a group of specific luminescent compounds.

Different combinations of luminescent markers may identify various properties of the marked material. In particular, the presence of a particular luminescent marker may identify the material that was marked, for example as organic cotton or recycled PET. The presence and proportions of additional markers may then be indicative of further information such as the time of marking, the origin in terms of country, producer or factory, or the luminescent markers may be indicative of a particular batch of material produced in a particular location in a particular time frame. A forensic marker may also be added, which is not detectable by spectroscopy, but only by physical processing of the material in a laboratory setting, for example by burning or otherwise destroying the material and detecting a marker that was present in a very low concentration. In this way, when it is discovered that marked materials have been blended in an unauthorised way, the specific supply chain may be identified and investigated.

Thus, the method may comprise associating the product with a defined portion of the marked material using the spectroscopic data associated with the one or more luminescent markers, where a defined portion may comprise material from a particular batch of material produced in a particular location in a particular time frame, or may comprise material generally from a particular location, producer or time frame.

In some instances, spectroscopic data may be additionally used to identify further characteristics such as the origin of the marked material beyond the information associated with the luminescent marker. For example, while a marker may identify a marked material as being organic or recycled cotton, spectroscopic data from the product may be used to further characterise the marked material, such as by identifying its source by differences in its chemical composition.

The spectroscopic data in part (ii) may be spectroscopic data forming part of composite signal or, for example where the composite signal used for the quantification step uses imaging data, spectroscopic data identifying the one or more luminescent markers may be obtained independently of the composite signal. For example, spectroscopic data of the composite signal, preferably obtained from a plurality of portions of the product, may be used for both identifying the luminescent markers that are present (and consequently identifying the marked material) and for the quantification step. Alternatively, in instances where quantification is performed based on a composite signal comprising imaging data, preferably relating to a plurality of portions of the product, spectroscopic data may be obtained and used for identifying the marked material based on the spectrum of the one or more luminescent markers but not the quantification.

The method may comprise, based on spectroscopic data collected from the product, automatically selecting reference data associated with one or more reference materials comprising the marked material, where the quantification step is based on the composite signal and said reference data. Thus, reference data may be automatically selected that corresponds to reference materials including the material that was marked with the identified luminescent marker, for example where the marked material is identified as cotton, reference data relating to mixtures of marked cotton with other materials, for example non-marked cotton or other synthetic or non-synthetic fibres, is selected. In this way, the reference data that is used for quantification can be refined to improve the accuracy and/or efficiency of the quantification, and can avoid the need for user input, which is advantageous where quantification is performed by non-technical users in a supply chain.

It has been found that variations in composition may be accounted for if they are identified by using reference data that corresponds to the types of materials that are present. However, it is not practical for untrained users at various points in the supply chain of a product to be able to account for such variations or to identify the appropriate reference data. Accordingly, it can be beneficial to improve quantification methods when a particular marked material is blended with other materials, the nature of which may not be apparent from simple inspection. It has been found that by selecting reference data that is used in quantifying the proportion of a marked material that is present in a product based on spectroscopic data collected from the product, problems associated with variations in the luminescent signal, such as variable background spectra or variation in marker distribution may be avoided. By selecting reference data that is used in quantifying the proportion of a marked material that is present in a product based on spectroscopic data collected from the product, the accuracy and reliability of quantification measurements may be improved. Without wishing to be bound by any particular theory, it is believed that by accounting for variation in the data collected—such as differences in the background spectrum where different materials are mixed with the marked material or variation in distribution of markers after processing of the material—and identifying appropriate reference data, quantification can be performed on a wide range of processed products without the need to manually identify the composition and properties of the product.

In preferred embodiments, automatically selecting reference data comprises determining the identity and/or quantity of the one or more materials mixed with the marked material and selecting reference data associated with the one or more materials. Determining the identity of said one or more materials may comprise determining information relating to the chemical composition of the materials. For example, spectroscopic data collected from the product may be used to determine that the product primarily comprises the same material as the marked material, and reference data may be selected that corresponds to such mixtures, for example marked cotton mixed with non-marked cotton, or a marked recycled plastic mixed with a corresponding non-marked plastic. In other instances, the spectroscopic data collected from the product may be used to determine that the product comprises a mixture of the marked material with a different material, for example where a natural fibrous material such as cotton is mixed with synthetic fibres such as polyesters. The relative quantity of different materials in the product may also be determined, for example determining that a material is approximately 50% cotton and 50% polyester such as PET. While this may give an indication of the constituents in the product, this does not identify the source or how much of the material is marked. For example, it may be determined that a material contains a certain proportion of a material that is substantially physically the same as the marked material, but without quantification using luminescent markers it would not be known whether all of that material is of the specified quality or origin.

Spectroscopic data collected from the product may alternatively or additionally be used to determine that the product contains additives having particular properties, for example dyes or pigments or other additives such as functional coatings, antimicrobial agents and the like on the product. Such additives may be present in comparatively small amounts but may have significant spectroscopic signatures, for example dyes or pigments that are routinely used in garments may show a significant spectroscopic response that can be accounted for by identifying the spectroscopic signature before performing quantification. Examples of such additives or pigments include perylene based additives/pigments, titanium oxide, carbon black and any other materials having a significant spectral response. In particular, where carbon black, which is optically very absorbent, is added to a product this has been found to interfere with the signal of luminescent markers. Thus, the spectroscopic data collected from the product may be used to determine that the product contains carbon black and select reference data associated with the presence of carbon black.

In some instances, the product may comprise more than one marked material and consequently more than one unique luminescent marker or combination of markers. For example, the product may contain a mixture of marked recycled cotton with marked recycled PET. Thus, spectroscopic data collected from the product may be used to identify a second marked material in the product, where the identity of the second marked material is used to select associated reference data.

Thus, by automatically selecting reference data that is used in quantifying the proportion of a marked material that is present in a product based on spectroscopic data collected from the product, the accuracy and reliability of quantification measurements may be improved. This may allow for untrained users at various points in the supply chain of a product to avoid the need to account for variations in the product composition and identifying the appropriate reference data, particularly where it is not immediately apparent what materials may have been blended together. For example, where a product is a blend of marked organic cotton with synthetic fibres or non-organic cotton, but the product is reported as 100% organic cotton, it may not be possible for a party to recognise what materials might have been blended into the product upstream in the supply chain.

The spectroscopic data collected from the product for use in automatically selecting reference data may be spectroscopic data forming part of composite signal or, for example where the composite signal used for the quantification step uses imaging data, spectroscopic data used for automatically selecting reference data may be obtained independently of the composite signal. For example, the spectroscopic data used for use in automatically selecting reference data may comprise the same spectroscopic data used in part (ii) to identify the marked material based on the luminescent markers, or spectroscopic data of the composite signal, preferably obtained from a plurality of portions of the product, may be used for both the quantification step and for use in automatically selecting reference data, and may also be used in identifying marked material in step (ii). Alternatively, in instances where quantification is performed based on a composite signal comprising imaging data, preferably relating to a plurality of portions of the product, spectroscopic data may be obtained and used for part (ii) and for use in automatically selecting reference data but not the quantification.

Thus, in some preferred embodiments, the spectroscopic data for use in automatically selecting reference data may comprise a background signal in spectroscopic data of the composite signal. The spectroscopic data used for use in automatically selecting reference data may preferably comprise data collected from the infrared region of the electromagnetic spectrum, for example near-IR wavelengths of around 780 nm to 2500 nm. Consequently, the composite signal may include spectroscopic data collected from the infrared region of the electromagnetic spectrum, which is then also used for automatically selecting reference data and optionally part (ii). The identification of materials using infrared spectroscopy is known in the art and is described, for example, in AUTEX Research Journal, Vol. 19, No 2, June 2019.

Where the spectroscopic data used for automatically selecting reference data and part (ii) comprises spectroscopic data of the composite signal, a pattern recognition process may identify the marked material, select reference data, and quantify the proportion of marked material in the product. For example, selecting the reference data may comprise a pattern recognition or machine learning element identifying features of the background spectrum containing the luminescent signal of the luminescent marker and classifying the materials present based on that spectrum before quantifying the proportion of the marked material based on the signal of the luminescent marker.

In other preferred embodiments, the spectroscopic data used for automatically selecting reference data comprises additional spectroscopic data different to spectroscopic data of the composite signal. For example, the method may comprise obtaining first spectroscopic and/or imaging data as part of the composite signal and further obtaining second spectroscopic data for use in automatically selecting reference data. For example, the method may comprise obtaining spectroscopic and/or imaging data associated with a luminescent signal of the one or more luminescent markers in the marked material in one wavelength range and obtaining spectroscopic data in a different wavelength range or using a different technique for use in automatically selecting reference data. In particular, the method may comprise obtaining near-IR or Raman spectroscopic data from the product for use in automatically selecting reference data, while the spectroscopic and/or imaging data of the composite signal may relate to luminescence spectra collected around the visible region of the electromagnetic spectrum (e.g. from 280 to 1100 nm). Obtaining spectroscopic data for use in automatically selecting reference data may therefore comprise scanning the product with a second detector that is separate to a detector that may be used to collect data for the composite signal. For example, the second detector may comprise an infrared or Raman spectrometer such as are known in the art.

In preferred embodiments, the method may comprise obtaining second spectroscopic data from the product, different from the spectroscopic data used in part (ii), and using said second spectroscopic data for determining the overall material composition of the product or determining the identity and/or quantity of the one or more materials mixed with the marked material. The second spectroscopic data may therefore not be used for quantification or reference data selection. For example, obtaining near-IR or Raman spectroscopic data, preferably near-IR spectroscopic data, from the product and using said data for determining the identity and/or quantity of the one or more materials mixed with the marked material. For example, the one or more luminescent markers may be used to identify the marked material, and the second spectroscopic data from a second spectrometer, such as an infrared or Raman spectrometer, may be used to identify additional materials present in the product. As will be understood, using second spectroscopic data in this way will suitably identify the total composition of the product, i.e. the presence of the material that is marked as well as any additional materials where such materials are different from the marked material.

By identifying the materials present in the product in addition to quantifying the proportion of the marked material that is present in the product, where the proportion of the marked material is less than expected, the identity of the material that has been blended with the marked material may be identified. For example, where the product is identified as consisting essentially of cotton, but less marked cotton than expected is present, the source of the blending may be identified. Similarly, in examples where the product is expected to contain a mixture of PET and marked cotton having lower than expected marked cotton content, whether an excess of cotton or an excess of PET is present may aid in identifying at which stage of the process unauthorised blending has occurred (i.e. whether the blending was with additional PET or additional unmarked cotton).

Thus in some preferred embodiments, the composite signal may comprise (i) spectroscopic data collected using a first spectrometer for detecting the luminescent signal of the one or more luminescent markers, (ii) imaging data collected using a camera for imaging the luminescent markers, and (iii) spectroscopic data collected using a second spectrometer, such as a near-IR spectrometer, for determining the identity and/or quantity of the one or more materials mixed with the marked material. For example, a composite signal may be collected using a fixed or in-line device as described previously comprising a first spectrometer, a camera, and a second spectrometer. In a moving device, each spectrometer/camera may be moved independently or may be moved together, for example the spectrometers and camera may be affixed together for movement over a product simultaneously (or similarly for simultaneous scanning in a fixed arrangement).

Where the spectroscopic data in for use in automatically selecting reference data cannot be used to identify a specific material of the product and corresponding reference data, for example where there is no corresponding reference data available, automatically selecting the reference data may comprise selecting reference data that is the closest fit to the product being analysed. For example, while different pigments or dyes may have different overall spectral responses, pigments or dyes of the same colour may have similar enough spectra that reference data relating to one may nonetheless be used for the other to improve the quantification measurement. In some embodiments, when the spectroscopic data for automatically selecting reference data cannot be used to identify a specific material of the product and corresponding reference data, and the composite signal comprises imaging data, the imaging data may be used alone, or a higher weighting may be applied to the imaging data in the quantification step. In this way, the effect of a varying background spectrum on the quantification may be reduced.

Reference data may be selected based on a determination in part (ii) that the marked material comprises a defined portion of the marked material, for example associated with a particular source, such as a supplier, region, factory, or batch and reference data corresponding to measurements made of reference material from that source or batch may be used in the quantification. Alternatively, the reference data may be reference data that is associated only with the composition of materials in the product and not specifically linked to a defined portion of marked material. The reference data may comprise a combination of data based on a defined portion of the marked material and general data that is selected based on spectroscopic data. For example, reference data may be selected based on spectroscopic data and refined based on information relating to the source or batch of the marked material. Where a particular batch is known to have properties that differ from a standard material, for example differences in material composition or concentration of luminescent marker, this may be used to refine the reference data used in the quantification.

In some instances, the reference data used in the quantification may comprise model data based on extrapolation of a known relationship between different forms of a material, for example different stages in the supply chain of a material. Thus, reference data may only relate to collected spectroscopic data for some forms of material, and may be extrapolated based on a known relationship (for example by pattern recognition) with further processed or less processed forms of the material. In this way, additional reference data may be collected once at the point of marking the material, and extrapolated to downstream forms of that material, for example from raw cotton to yarn to fabric, or from extruder stream of plastic to filament to fabric or particular moulded products. Similarly, the reference data used in the quantification may comprise model data based on extrapolation of a known relationship between different instruments used to collect the spectroscopic and/or imaging data. For example, an in-line detector may collect spectra or images having a first resolution and/or spectral range, while a different detector such as a handheld detector may collect spectra or images having a second, lower resolution and/or narrower spectral range. Model reference data may then be used to extrapolate the data from one detector to compare it to data from a second different detector, for example reference data may be collected autonomously by in-line or robotic detectors, while a handheld detector may be utilised by users such as retailers to analyse the product.

As described herein, the marked material contains one or more luminescent markers, and the markers may be incorporated into the marked material in any suitable way and it will be appreciated that the method of incorporating the marker may vary based on the nature of the marked material. For example incorporating the luminescent markers may comprise integration into fibres, mixing of pre-marked fibres into bulk fibres, coating of fibres, integration of markers substances into threads, yarn or filaments, coating of threads, yarn or filaments, coating of woven or non-woven fabrics, coating materials such as by painting or dyeing, varnishing, rotary coating, spray painting, thermal spraying, plasticizing, dip coating such as anodic or cathodic dip coating, hot dipping, enameling, slot nozzle coating, knife coating, spray coating, roller coating, multiple coating by cascade or curtain casting, sol-gel, powder coating, drum coating, sintering, printing such as by integration via inks, varnishes, primers or other printing media, integration into 3D printing feeds.

The markers may be incorporated into a material to be marked during a production process where inherent homogenisation of the material in the process helps to distribute the markers. For example, in the case of natural fibres, the markers may be incorporated into the fibres in a raw stage, where subsequent processes such as bale opening help to distribute the markers throughout the material, or the markers may be added during spinning to provide marked yarn. In other instances such as for plastic materials, the markers may be added to a melt stream, for example by dosing (for example using a liquid masterbatch dosing system) the markers into an extruder from which pellets or filament of the plastic may be extruded.

The luminescent markers may be added directly to the material or may be incorporated into a carrier material which is then incorporated into the material. For example, in the case of fibrous materials, luminescent markers may be incorporated into slivers of a material that is the same as or substantially the same as the material to be marked, and the slivers then incorporated with fibres of the material to be marked during the production process. In the case of plastic materials, a masterbatch dosing may be used where the markers are encapsulated in or coated onto particles of the same plastic or another resin, or distributed in an appropriate solvent (liquid masterbatch), and incorporated into a molten stream of the material to be marked.

The markers may be added to the material to be marked in any concentration suitable for allowing detection whilst retaining the properties of the marked material. In some preferred embodiments, in a concentration 1000 ppm or less, for example 500 ppm or less or 100 ppm or less. By marking materials with low concentrations of markers, it may be more difficult for the markers to be analysed or detected without the knowledge of their presence or suitable spectroscopic equipment. In this way, the security of the marking may be improved. It will be appreciated that the concentration of the marker may be varied based on the material being marked and/or its intended use, for example to provide a stronger signal that can be more easily identified alongside additives or other blended materials that may be anticipated to be added later in the supply chain. Thus, in some embodiments higher marker concentrations may be used, for example up to 2000 ppm or up to 5000 ppm.

The luminescent markers may be in any suitable form, for example disposed in a carrier as described previously or added to the marked material directly without a carrier. In some preferred embodiments, the luminescent markers in the marked material have particle size distribution with a D90 of no more than 1,000 μm, preferably 100 μm, for example 10 μm and/or in some embodiments the luminescent markers have a particle size distribution with a D10 of at least 0.1 μm, preferably at least 1 μm, for example at least 10 μm. As will be appreciated, D90/D10 refers to the proportion of particles in the distribution that fall below the stated measurement. The particle size distribution may be measured in any suitable way, for example by sieving or light scattering (e.g. according to ISO 13320:2020). The markers may be present in any suitable shape and in some instances may be in the form of substantially spherical particles.

The luminescent markers may be continuously added to the marked material during production, for example by an automated dosing system, so as to control the concentration of markers in the marked material. In some preferred embodiments, the addition of markers to the material to be marked may be at least in part based on feedback from a downstream detector that is arranged to analyse the luminescent signal of the markers. In this way, a consistent concentration of markers may be achieved in the marked material.

In preferred embodiments, the method may further comprise automatically uploading information corresponding to the quantified proportion of a marked material that is present in the product as an entry to a distributed ledger associated with the product. For example, the information may comprise a value or range for the proportion of the marked material that was determined to be in the product, or the information may comprise an indication of whether the proportion of the marked material is consistent with value specified by a supplier or if the proportion of the marked material is below a threshold value.

A distributed ledger provides a record of information that is distributed across multiple locations and/or parties. By using luminescent markers as described herein, a marked material may be identified and tracked through supply chains and processing of the material. Thus, a distributed ledger may be used to track the movements and processing of a marked material in a way that is not controlled by any single party. The distributed ledger may be a secure distributed ledger where data stored in the ledger is not editable by parties uploading information, or where the entire history of such changes are recorded in the ledger. The distributed ledger may in preferred embodiments be a blockchain system, which may be private or public.

Information relating to the material may be uploaded by parties in the supply chain at various stages, such as whether the material has been blended or processed in any way with additives or by physical transformation of the material such as spinning yarn, forming a fabric, extruding a plastic and forming filament and fabrics, or moulding the material. However, even where a secure distributed ledger is used, the information uploaded is only as reliable as its source, and if there is no further verification, or only intermittent verification of the information being uploaded, information may be falsely reported, for example to try to blend a material with cheaper materials without reporting this to parties further down the supply chain.

In this way, by scanning the material, quantifying the proportion of marked material, and automatically uploading quantification information to a distributed ledger, it is possible to prevent falsification of information regarding a product because every party with access to the distributed ledger can see whether a product comprising the marked material is as specified or not. This can be repeated at multiple points in the supply chain to provide a detailed record of any mixing of the marked material with other materials, and in what proportions. As the uploading is automatic, the information relating to the quantification cannot be manipulated prior to making the information available other parties with access to the ledger. Thus, automatically uploading quantification information to a distributed ledger is preferably a machine-to-machine communication that prevents manipulation of the information. For example, a system that quantifies the proportion of marked material in a product according to the present method may have electronic communications capabilities, such as internet connectivity, and be configured to automatically upload the quantification information.

In preferred embodiments, automatic uploading to a distributed ledger may be used in conjunction with in-line scanning of a process flow of a product. In this way, the quality and identity of the product may be continuously verified and reported without the need for untrained users to perform analysis of their materials, which may be uneconomical or not technically possible even if the desire is present to do so.

Whether the quantification information is uploaded to a distributed ledger or not, a quantification of marked material can be performed at each stage of the supply chain to automatically analyse and record quantification information. This can be done without the need for trained users to analyse materials or time-consuming laboratory testing and so can be performed continuously more efficiently.

Uploading quantification information to a distributed ledger may comprise generating, or adding information to, a token associated with the marked material or the product. The marked material, during the marking process or downstream of it, may be associated with a plurality of tokens associated with the distributed ledger, for example blockchain tokens. The tokens may therefore be automatically generated to contain, or updated with, quantification information as described previously. For example, a material being marked, or a previously marked material, may be scanned and each defined portion of the material (e.g. each tonne) associated with a token. When the material is sold or transferred to a third party, the associated token(s) can be transferred at the same time. The third party can then scan the material to quantify the proportion of the marked material that is present, and without human intervention the token associated with the marked material can be automatically updated with the quantification information. In this way, when a party receives a material and associated token(s), the history of the material in the supply chain can be verified.

The token can also contain additional information that can be updated at each stage of a supply chain, for example relating the source and supply chain such as a previous suppliers, regions, factories, or batches, as well as associated information such as how much energy or resources were used at each stage or the type of labour used (e.g. to verify that unethical labour practices such as child labour were avoided in the supply chain of a received material). The information associated with the token may also be made accessible to end consumers, for example by including a scannable identifier such as a QR code that can be used to direct a consumer purchasing a product comprising the marked material to information relating to the supply chain of the material in the product. By automatically updating the information of the token when the material is scanned, falsifying information of the material composition can be avoided and a receiver of the material can be more confident that the material was not blended with materials from unknown sources during manufacture.

In some preferred embodiments, where the quantified proportion of marked material deviates from an expected value, for example a value that may be defined for a product prior to analysis, an alert signal may be provided to a user. For example, an electronic communication such as an email, mobile device notification, SMS or similar may be sent to a defined recipient or list of recipients. In this way, where a deviation from an expected proportion of marked material is identified, this can be marked for further investigation.

A further aspect provides a system for quantifying the proportion of a marked material that is present in a product, wherein the product comprises a mixture of one or more materials and the marked material contains one or more luminescent markers, the system comprising:

a controller configured to obtain a composite signal associated with the product, the composite signal including spectroscopic data and imaging data collected from the product, the spectroscopic and imaging data associated with a luminescent signal of the one or more luminescent markers in the marked material;

wherein the controller is further configured to:

(i) identify the marked material based on spectroscopic data associated with the one or more luminescent markers; and (ii) quantify the proportion of the marked material that is present in the product based at least in part on said imaging data of the composite signal, wherein said quantifying is based at least in part on the relative positions of and/or the number of luminescent markers detected in each image of the product.

As will be appreciated, elements of said system may be substantially as defined previously herein.

As will be appreciated, the controller may be configured to perform the method substantially as defined previously herein, and the product, marked material, luminescent markers, composite signal, spectroscopic and/or imaging data, reference data and any other elements of said system may be substantially as defined previously herein.

In particular, the system may further comprise a detector communicatively coupled to the controller, the detector preferably configured to provide the composite signal by scanning a plurality of different portions of the product to detect the one or more luminescent markers associated with the marked material. The detector may comprise any suitable detector as described previously herein. For example, the detector may comprise an in-line detector for scanning a process flow of the product, or a movable detector, for example a handheld detector or a system configured to move a detector over the surface of the product such as a robotics system.

In preferred embodiments, the detector may comprise a movable or in-line device comprising a first spectrometer for detecting the luminescent signal of the one or more luminescent markers, a camera for collecting images of the luminescent markers in the material, and a second spectrometer, such as a near-IR spectrometer, for determining the identity and/or quantity of the one or more materials mixed with the marked material. As part of a moving device, each spectrometer/camera may be moved independently or may be moved together, for example the spectrometers and camera may be affixed together for movement over a product simultaneously (or similarly arranged for simultaneous scanning in a fixed arrangement).

Alternatively, the system may comprise communication means for receiving spectroscopic and/or imaging data and/or a composite signal from a remote detector or memory storing said data. The system may further comprise a memory storing a database of reference data, or means to access reference data from a remote system such as a server.

A further aspect provides a scanning system for obtaining spectroscopic data and imaging data from a product, the system comprising:

- a first spectrometer for detecting the luminescent signal of one or more luminescent markers present in the product;
- a camera for collecting images of the luminescent markers in the product; and
- a second spectrometer, such as a near-IR spectrometer, for determining the identity and/or quantity of the one or more materials mixed with the marked material.

The scanning system may be configured for in-line scanning of the product, or configured for moving the first spectrometer, the camera, and the second spectrometer across the surface of the product in order to scan multiple portions of the product. Preferably, the scanning system is configured to move the first spectrometer, the camera, and the second spectrometer across the surface of the product. For example, the scanning system may comprise a motion control system, such as a motion control frame configured to move the spectrometers and camera across the surface of the product. The scanning system may also comprise a sample holder for securing the product to be scanned.

The scanning system may in some instances further comprise a controller configured to quantify the proportion of a marked material that is present in the product as described previously.

As described previously, it has also been found that variations in composition may be accounted for if they are identified by using reference data that corresponds to the types of materials that are present. However, it is not practical for untrained users at various points in the supply chain of a product to be able to account for such variations or to identify the appropriate reference data. Accordingly, there is therefore a need for ways to improve quantification methods when a particular marked material is blended with other materials, the nature of which may not be apparent from simple inspection.

It has been found that by selecting reference data that is used in quantifying the proportion of a marked material that is present in a product based on spectroscopic data collected from the product, problems associated with variations in the luminescent signal, such as variable background spectra or variation in marker distribution may be avoided.

Thus, a further aspect provides a method of quantifying the proportion of a marked material that is present in a product, wherein the product comprises a mixture of one or more materials and the marked material contains one or more luminescent markers, the method comprising:

- (i) obtaining a composite signal associated with the product, the composite signal including spectroscopic and/or imaging data collected from the product, the spectroscopic and/or imaging data associated with a luminescent signal of the one or more luminescent markers in the marked material;
- (ii) identifying the marked material based on spectroscopic data associated with the one or more luminescent markers;
- (iii) based on spectroscopic data collected from the product, automatically selecting reference data associated with one or more reference materials comprising the marked material; and
- (iv) quantifying the proportion of the marked material that is present in the product based on said composite signal and said reference data.

By selecting reference data that is used in quantifying the proportion of a marked material that is present in a product based on spectroscopic data collected from the product, the accuracy and reliability of quantification measurements may be improved. Without wishing to be bound by any particular theory, it is believed that by accounting for variation in the data collected—such as differences in the background spectrum where different materials are mixed with the marked material or variation in distribution of markers after processing of the material—and identifying appropriate reference data, quantification can be performed on a wide range of processed products without the need to manually identify the composition and properties of the product.

The composite signal used may comprise spectroscopic and/or imaging data as described previously. For example, in some embodiments the composite signal may comprise only spectroscopic data and not imaging data, or may comprise only imaging data and not spectroscopic data. In some embodiments, the composite signal may comprise both spectroscopic and imaging data, which may directly correlate or may be at least partially independent as described previously.

A further aspect provides a system for quantifying the proportion of a marked material that is present in a product, wherein the product comprises a mixture of one or more materials and the marked material contains one or more luminescent markers, the system comprising:

- a controller configured to obtain a composite signal associated with the product, the composite signal including spectroscopic and/or imaging data collected from the product, the spectroscopic and/or imaging data associated with a luminescent signal of the one or more luminescent markers in the marked material;

wherein the controller is further configured to:

(i) identify the marked material based on spectroscopic data associated with the one or more luminescent markers;

(ii) based on spectroscopic data collected from the product, automatically select reference data associated with one or more reference materials comprising the marked material; and (iii) quantify the proportion of the marked material that is present in the product based on said composite signal and said reference data.

As will be appreciated, elements of said system may be substantially as defined previously herein.

In addition, as described previously, by using a composite signal comprising data relating to a plurality of portions of the product, analysis may be improved by not only analysing variations (for example in marker intensity or distribution) within an individual spectrum or image, but also taking into account variations between a series of spectra and images taken from a plurality of portions of the same product, which adds a further variable for comparison to reference data.

Thus, a further aspect provides a method of quantifying the proportion of a marked material that is present in a product, wherein the product comprises a mixture of one or more materials and the marked material contains one or more luminescent markers, the method comprising:

obtaining a composite signal associated with the product, the composite signal including spectroscopic and/or imaging data collected from a plurality of different portions of the product, the spectroscopic and/or imaging data associated with the one or more luminescent markers in the marked material;

quantifying the proportion of the marked material that is present in the product based on said composite signal and one or more composite reference signals comprising spectroscopic and/or imaging data collected from a plurality of different portions of one or more respective reference materials that comprise the marked material.

As discussed previously, even where it is intended to control the distribution of markers to uniformly distribute markers into a marked material, variations in distribution may remain. In addition, where the marked material is mixed with further materials or further processed physically, an initial uniform distribution may be disrupted. By using a a composite reference signal to quantify the proportion of the marked material that is present in the product, an extra dimension of variation in the data may be included in the analysis that may improve the accuracy of the quantification and better account for variations in marker distribution throughout the product.

Thus, a further aspect provides a method of producing one or more composite reference signals associated with a marked material, for quantifying the proportion of the marked material that is present in a product, the method comprising:

(i) providing a reference material comprising a known proportion of a marked material, the marked material containing one or more luminescent markers;

(ii) scanning a plurality of different portions of the reference material to obtain spectroscopic and/or imaging data associated with said one or more luminescent markers;

(iii) associating the spectroscopic and/or imaging data from a plurality of different portions of the reference material with a common identifier to provide a composite reference signal associated with the reference material;

repeating steps (i) to (iii) for one or more further reference materials that comprise the marked material to obtain a plurality of composite reference signals associated with the further reference materials.

As described previously herein, the one or more reference materials may comprise different mixtures of the marked material with other materials and/or where the marked material is present in different proportions.

Producing one or more composite reference signals may also be combined with a marking process, where a material is marked with a luminescent marker and a composite reference signal recorded for the material downstream of the incorporation of the one or more markers.

In addition, as described previously, by quantifying the proportion of marked material in a product and automatically uploading quantification information to a distributed ledger, it is possible to prevent falsification of information regarding a product because every party with access to the distributed ledger in the supply chain can see whether a product comprising the marked material is as specified or not.

Thus, a further aspect provides a method of tracking a marked material and quantifying the proportion of a marked material that is present in a product, wherein the product comprises a mixture of one or more materials and the marked material contains one or more luminescent markers, the method comprising:

obtaining a composite signal associated with the product, the composite signal including spectroscopic and/or imaging data collected from the product, the spectroscopic and/or imaging data associated with the one or more luminescent markers in the marked material;

quantifying the proportion of the marked material that is present in the product based on said composite signal and reference data associated with one or more respective reference materials that comprise the marked material; and automatically uploading information corresponding to the quantified proportion of the marked material that is present in the product as an entry to a distributed ledger associated with the product and/or the marked material.

As described previously, inorganic luminescent markers may be particularly effective in products such as recycled materials which may be processed using harsh chemical conditions or at high temperatures and stress in reprocessing, where the inorganic luminescent markers surprisingly remain stable as markers in the material. In this way, there is a synergy between the use of inorganic luminescent markers and the marking of recycled materials.

Thus, a further aspect provides a method of marking a recycled material for subsequent identification, wherein the method comprises distributing inorganic luminescent markers into the recycled material during the recycling process.

The inorganic luminescent markers may be substantially as defined previously herein. It will be appreciated that particular markers may be suited to particular materials and recycling methods. For example, the marker may be selected as being heat resistant or chemically stable, for example at a particular pH.

For example, markers based on nitrides, siliconitrides, oxides, silicates, aluminates or germinates may be particularly stable at high temperatures and suited to marking recycled plastics or insulating fibres such as glass wool or mineral wool, where high temperatures may be used to melt and shape the materials.

Markers based on molybdates, oxides, nitrides, oxysulfides, borates, phosphates, germinates may for example be used to provide stable markers under basic conditions, while markers based on tungstates, nitrides, siliconitrides, silicates, borates or phosphates may be used to provide stable markers under acidic conditions.

Distributing inorganic luminescent markers into the recycled material may be performed as described previously herein, for example using a masterbatch dosing system or any other suitable means. Where a material to be recycled already contains markers, these may be removed, for example by centrifuge, filtering or other suitable separation means prior to marking and recycling the material.

In preferred embodiments, the method comprises distributing inorganic luminescent markers into a recycled plastic. The method of marking a recycled plastic may therefore further comprise the step of marking plastic prior to de-polymerisation into monomers and/or re-polymerisation into new plastic, for example markers may be added to monomers derived from de-polymerisation of a plastic prior to re-polymerisation. The method may further comprise heating the marked recycled plastic and extruding or moulding the marked recycled plastic to form a product. In some instances, the marker may be added after re-polymerisation but before heating.

In other preferred embodiments, the method comprises distributing inorganic luminescent markers into recycled cotton, where the marker is added and the cotton shredded or dissolved into pulp from which the recycled cellulose fibre is extracted or spun out.

A further aspect provides a system for marking a recycled plastic for subsequent identification, wherein the system is configured to continuously incorporate one or more luminescent markers into a flow of recycled plastic, in particular wherein the system is configured to heat and extrude or mould the recycled plastic such that the luminescent markers are incorporated into the recycled plastic prior to extruding or moulding the recycled plastic.

The system may suitably be configured to continuously incorporate one or more luminescent markers into a flow of recycled plastic in any suitable way, for example by using a masterbatch dosing system, a hopper, or any other suitable apparatus. The markers may be incorporated into a molten flow of recycled plastic such as in an extruder, or may be mixed with the recycled plastic prior to melting and extruding or moulding the recycled plastic.

The system may also include an in-line detector such as a hyperspectral camera or other detector for collecting luminescence spectra and/or images of the marked recycled plastic.

A further aspect provides the use of inorganic luminescent markers as described herein, to mark recycled plastic materials.

In further aspects, there are provided a computer program product comprising program instructions configured to program a computer system to perform the methods described herein, and a control system for a detection system, comprising a processor and computer memory comprising the program instructions.

Aspects of the invention may be provided in conjunction with each other and features of one aspect may be applied to other aspects.

The invention will now be described by reference to the following non-limiting examples and drawings, in which.

Figure 1:
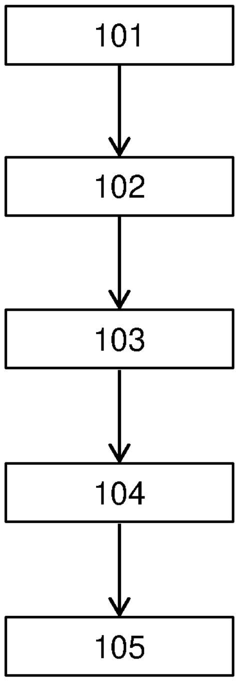
FIG. 1 shows a flow diagram for a method of quantifying the proportion of a marked material that is present in a product.

The flow diagram of FIG. 1 shows an exemplary method of quantifying the proportion of a marked material that is present in a product, wherein the product comprises a mixture of one or more materials and the marked material contains one or more luminescent markers. In step 101, a composite signal is obtained, the composite signal including spectroscopic and/or imaging data collected from the product, the spectroscopic and/or imaging data associated with a luminescent signal of the one or more luminescent markers in the marked material. Step 102 comprises identifying the marked material based on spectroscopic data associated with the one or more luminescent markers. Step 103 comprises automatically selecting reference data associated with one or more reference materials comprising the marked material based on spectroscopic data collected from the product. Step 104 comprises quantifying the proportion of the marked material that is present in the product based on said composite signal and said reference data.

By way of specific example, step 101 may comprise receiving multidimensional data representing spectroscopic and image data, for example collected by scanning a product with a hyperspectral camera multiple times to generate multiple images and associated spectra from different portions of the product. The multidimensional data thus forms a composite signal that represents the features of the multiple images and associated spectra collected from different portions of the product. If the frequency of measurement of spectroscopic data is fast enough, the luminescent response/lifetime of the luminescent marker(s) over time may be measured and included as a further variable/dimension in the multidimensional data. In other examples, instead of a hyperspectral camera separate imaging and spectroscopic apparatus may be used to collect multidimensional data.

In a specific example, the multidimensional data may have been collected by moving a scanner comprising a hyperspectral camera over a fabric or garment to scan multiple portions of the fabric, or moving a fabric past a fixed in-line hyperspectral camera and taking readings at defined intervals that may be coordinated with the speed of the fabric movement past the camera. In other instances, the product may comprise other forms of material such as a yarn or thread that is moved past a detector such as a hyperspectral camera.

Step 102 may then comprise analysing the multidimensional data by identifying the unique spectral response of a luminescent marker in the spectroscopic data, for example by the luminescent marker's response at a particular wavelength. The identity of the marker is then compared to a database in which the specific marker is linked to the previous marking of a specific material, for example organic cotton from a particular manufacturer. In order to broaden the scope for uniquely identifying multiple different sources, the unique spectral response may relate to the presence of two or more different luminescent markers in the material in a specific ratio. The identity of the material that was marked with the detected luminescent marker(s) is then associated with the multidimensional data.

In step 103, the spectroscopic data of the multidimensional data may then be analysed to determine the identity of materials that are present in the product. For example the near-IR region of the spectroscopic data, or separate spectroscopic data such as near-IR spectroscopic data, may be used to identify that the product is primarily cotton, a mixture of cotton and PET fibres or primarily PET fibres, or the visible region of the spectroscopic data may be used to identify that a particular colour of dye is present, which may be done by processing the spectroscopic data using pattern recognition to classify the product based on previously measured materials. The identity of materials that are present, and relative proportions, may then also be associated with the multidimensional data to refine the reference data that is to be used subsequently, for example by assigning a further variable/dimension to the multidimensional data that represents the materials that are present. Alternatively or in addition, the identity of materials that are present, identified spectroscopically, may be used to determine the nature of any blending identified by the quantification measurement, for example determining the nature of materials other than the marked material when the amount of marked material is less than expected. In this way, the source of blending or error in a supply chain may be identified.

In an example, the product is identified from the spectroscopic data as only or almost exclusively containing cotton. A reference data set that relates to different amounts of marked organic cotton blended with non-marked cotton may then be selected as the relevant reference data to compare to, which may comprise assigning a further variable to the multidimensional data that represents the presence of cotton. In a different example, the product is identified from the spectroscopic data as containing a mixture of PET and cotton. A reference data set that relates to different amounts of marked organic cotton blended with non-marked PET fibres may then be selected as the relevant reference data to compare to. In this way, compared to where only cotton is present, any interference of signals relating to PET in the spectroscopic data with the intensity of luminescent signals from the luminescent markers may be accounted for in the quantification to improve reliability.

Then, in step 104, using the reference data set selected, for example using the additional variables in the multidimensional data identifying the marked material as organic cotton and other materials present as cotton or PET fibres, the multidimensional data is compared to the reference data to determine how much of the marked organic cotton is present based on previously measured blends containing different amounts of marked organic cotton. In particular, a pattern recognition process using dimensional reduction to identify significant features of the data may be used to classify the amount of the material marked with the luminescent marker that is present.

In a different example, the product may be a fabric or a moulded plastic product, and in step 102 the luminescent marker(s) are identified as relating to recycled PET that was previously marked. In step 101 multidimensional data corresponding to a composite signal as described may be obtained from a process of scanning a melt flow of the PET, or by scanning a product such as a PET filament, fibres or fabric containing PET or a moulded PET product.

Step 103 may then comprise identifying from the spectroscopic data of the multidimensional data that the product contains essentially only PET. For example, the product may be a fabric that is made from PET or a moulded product. A reference data set that relates to different amounts of marked PET blended with non-marked PET may then be selected as the relevant reference data. Step 104 then comprises comparing the multidimensional data for the scanned product the reference data, for example as described previously, to determine how much of the marked recycled PET is present based on previously measured blends containing different amounts of marked recycled PET.

The above steps, including identifying the marked material, selecting reference data and quantifying the proportion of the marked material present may be simultaneously achieved by providing the multidimensional data to a pattern recognition process that processes the data to identify its characteristics, for example by using dimensional reduction techniques such as principal component analysis, where the pattern recognition process then classifies the product as containing a particular marked material in a particular amount based on comparing, for example by covariance analysis, to reference data that contains an entry relating to the same marked material, e.g. organic cotton, blended with a corresponding quantity of a second material, e.g. PET fibres. The comparison may in some cases simply comprise comparison with the "knowledge" of a trained machine learning element such as an artificial neural network that classifies the product rather than comparison with an explicit list of recorded data for different materials.

The method may also optionally comprise a further step 105 of automatically uploading information corresponding to the quantified proportion of the marked material that is present in the product as an entry to a distributed ledger such as automatically uploading an entry to a blockchain associated with the product and/or the marked material.

Although specific materials such as fabrics, cotton and PET and specific equipment such as a hyperspectral camera are mentioned above, these are merely illustrative examples and it will be appreciated that the method may be applied to other materials using other means as described herein.

Figure 2:
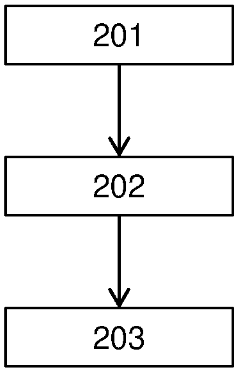
FIG. 2 shows a flow diagram for an alternative method of quantifying the proportion of a marked material that is present in a product.

The flow diagram of FIG. 2 shows an exemplary method of quantifying the proportion of a marked material that is present in a product, wherein the product comprises a mixture of one or more materials and the marked material contains one or more luminescent markers. Step 201 comprises obtaining a composite signal associated with the product, the composite signal including spectroscopic data and imaging data collected from the product, the spectroscopic and imaging data associated with a luminescent signal of the one or more luminescent markers in the marked material. Step 202 comprises identifying the marked material based on spectroscopic data associated with the one or more luminescent markers. Step 203 comprises quantifying the proportion of the marked material that is present in the product based at least in part on said imaging data of the composite signal, wherein said quantifying is based at least in part on the relative positions of and/or the number of luminescent markers detected in each image of the product.

By way of specific example, step 201 may comprise receiving multidimensional data representing spectroscopic and image data, for example collected by scanning a product with a hyperspectral camera multiple times to generate multiple images and associated spectra from different portions of the product. The multidimensional data forms a composite signal that represents the features of the spectrum of the luminescent markers and the multiple images collected from different portions of the product. In other examples, instead of a hyperspectral camera, separate imaging and spectroscopic apparatus may be used to collect multiple images from the product and at least one spectrum for identifying the luminescent markers.

In a specific example, the multidimensional data may have been collected by moving a scanner comprising a hyperspectral camera over a fabric or garment to scan multiple portions of the fabric, or moving a fabric past a fixed in-line hyperspectral camera and taking readings at defined intervals that may be coordinated with the speed of the fabric movement past the camera. In other instances, the product may comprise other forms of material such as a yarn or thread that is moved past a detector such as a hyperspectral camera.

Step 202 may then comprise analysing the multidimensional data by identifying the unique spectral response of a luminescent marker in the spectroscopic data, for example as described in relation to FIG. 1. The identity of the material that was marked with the detected luminescent marker(s) is then associated with the multidimensional data. For example, the markers may be associated with organic cotton or recycled PET.

Then, in step 203, the imaging data is analysed based on the relative positions of and/or the number of luminescent markers detected each image of the product, and compared to known results from previously measured blends to determine how much of the marked organic cotton or recycled PET. In particular, a pattern recognition process using dimensional reduction to identify significant features of the image data may be used to classify the amount of the material marked with the luminescent marker that is present. The pattern recognition may for example be based on reduced multidimensional data representing the relative positions of the markers in the images or may be based on image processing based pattern recognition for example using artificial neural network such as a convolutional neural network to analyse the images and classify the product as containing a particular proportion of the marked material. Information relating to the quantification may optionally also be automatically uploaded to a distributed ledger as described previously.

Figure 3:
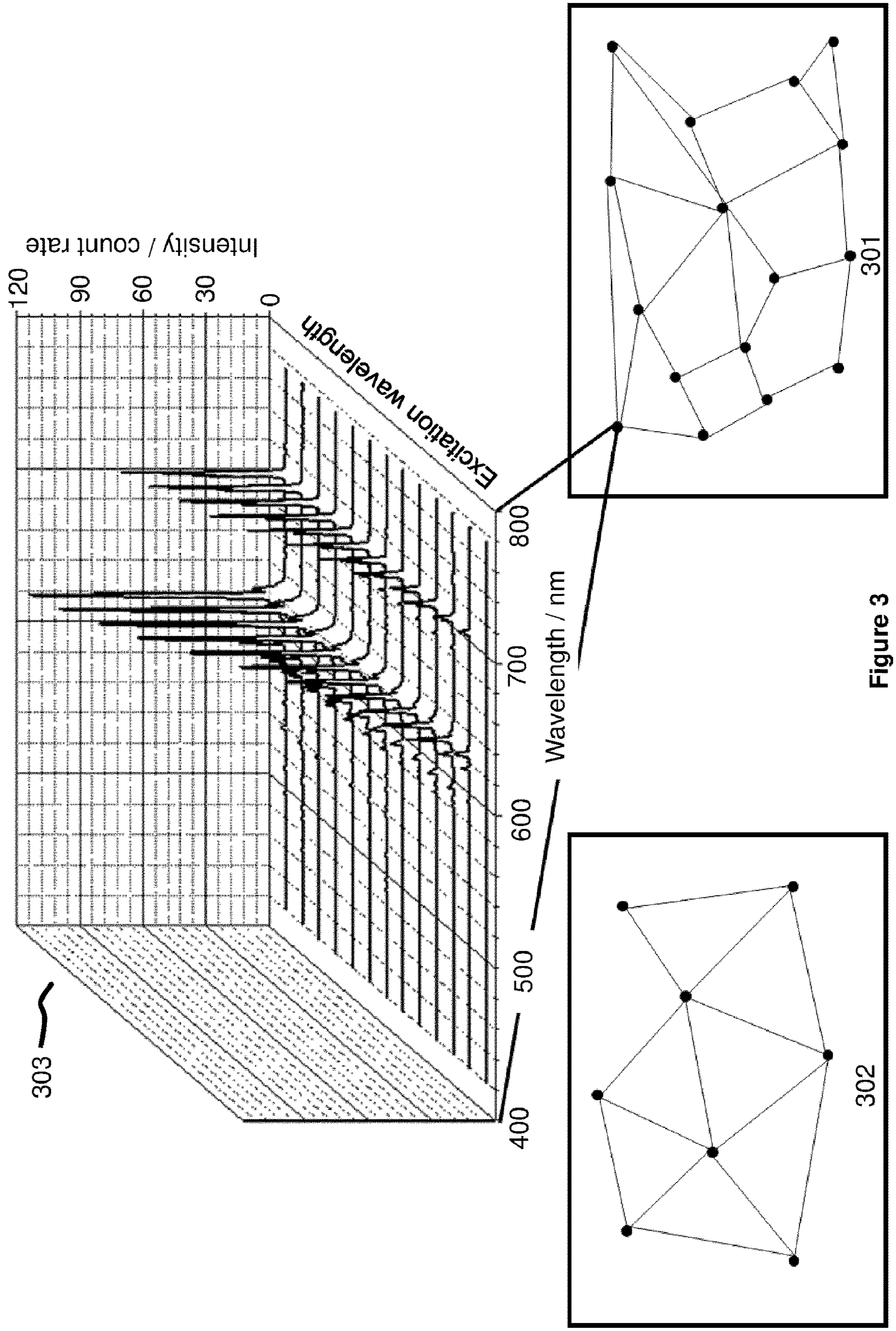
FIG. 3 shows a diagram showing a comparison of imaging data obtained for two materials containing luminescent markers.

FIG. 3 shows an example of imaging data obtained from marked materials. Inset 301 shows an image representing the positions of luminescent markers detected in a first material containing a first proportion of a marked material. Inset 302 shows an image representing the positions of luminescent markers detected in a second material containing a second proportion of a marked material that is less than the first proportion of marked material in the first material shown in 301.

As shown by inset 303, the imaging data may be multi-dimensional data comprising spectral data across the image, for example obtained using a hyperspectral camera. Inset 303 shows spectra relating to single point in the image 301, although it will be appreciated that spectral data may be recorded from across the entire image or only selected portions of the image such as where luminescent spots are observed. Inset 303 also shows a time-dependent spectral signal for a point in the image 301, where the luminescent response of a luminescent marker present in the marked material is recorded to further characterise the luminescent marker.

Figure 4:
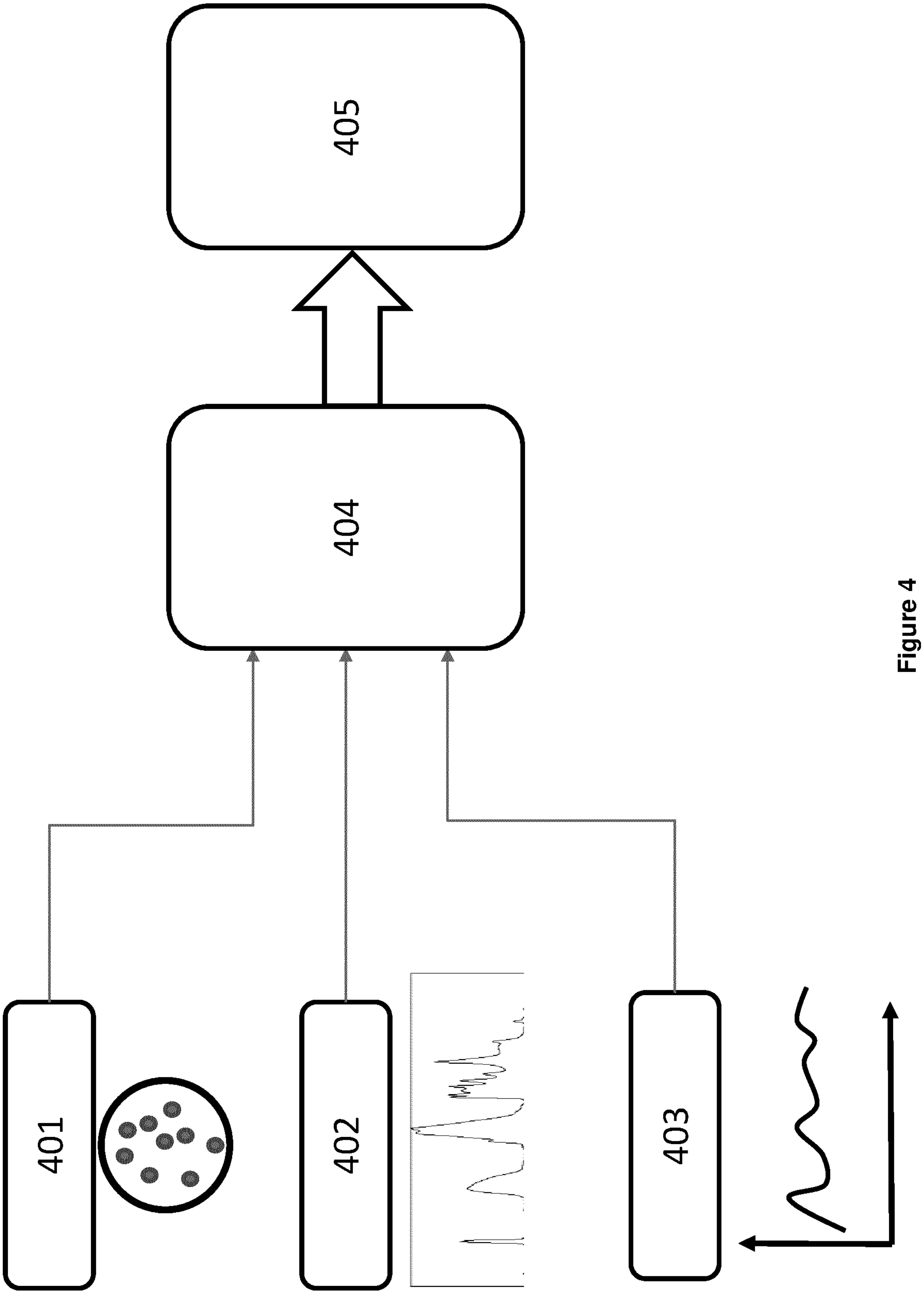
FIG. 4 shows a schematic for a system for quantifying the proportion of a marked material that is present in a product.

The schematic in FIG. 4 shows a system for quantifying the proportion of a marked material that is present in a product. At 401 a camera collects images showing the presence of luminescent markers in the material. At 402 a first spectrometer collects spectroscopic data for detecting the luminescent signal of the one or more luminescent markers. At 403 a second spectrometer collects second spectroscopic data, for example using a near-IR spectrometer, for identifying the composition of the material.

The data from 401, 402, and 403 is then passed to a pattern recognition or machine learning element 404, whereby quantifying the proportion of the marked material present may be simultaneously achieved by processing the data from 401, 402 and 403 to identify its characteristics, for example by using dimensional reduction techniques such as principal component analysis, where the pattern recognition or machine learning element 404 then provides an output 405. The output may classify the product as containing a particular marked material in a particular amount, as well as identifying the material composition, from which the source of a deficiency in marked material may be identified. The output may also contain additional information that can be identified from the input data 401, 402 and 403 by pattern recognition or machine learning element 404, such as colour or physical form of the material, for example in the case of a fabric, yarn count or weaving type.

Figure 5:
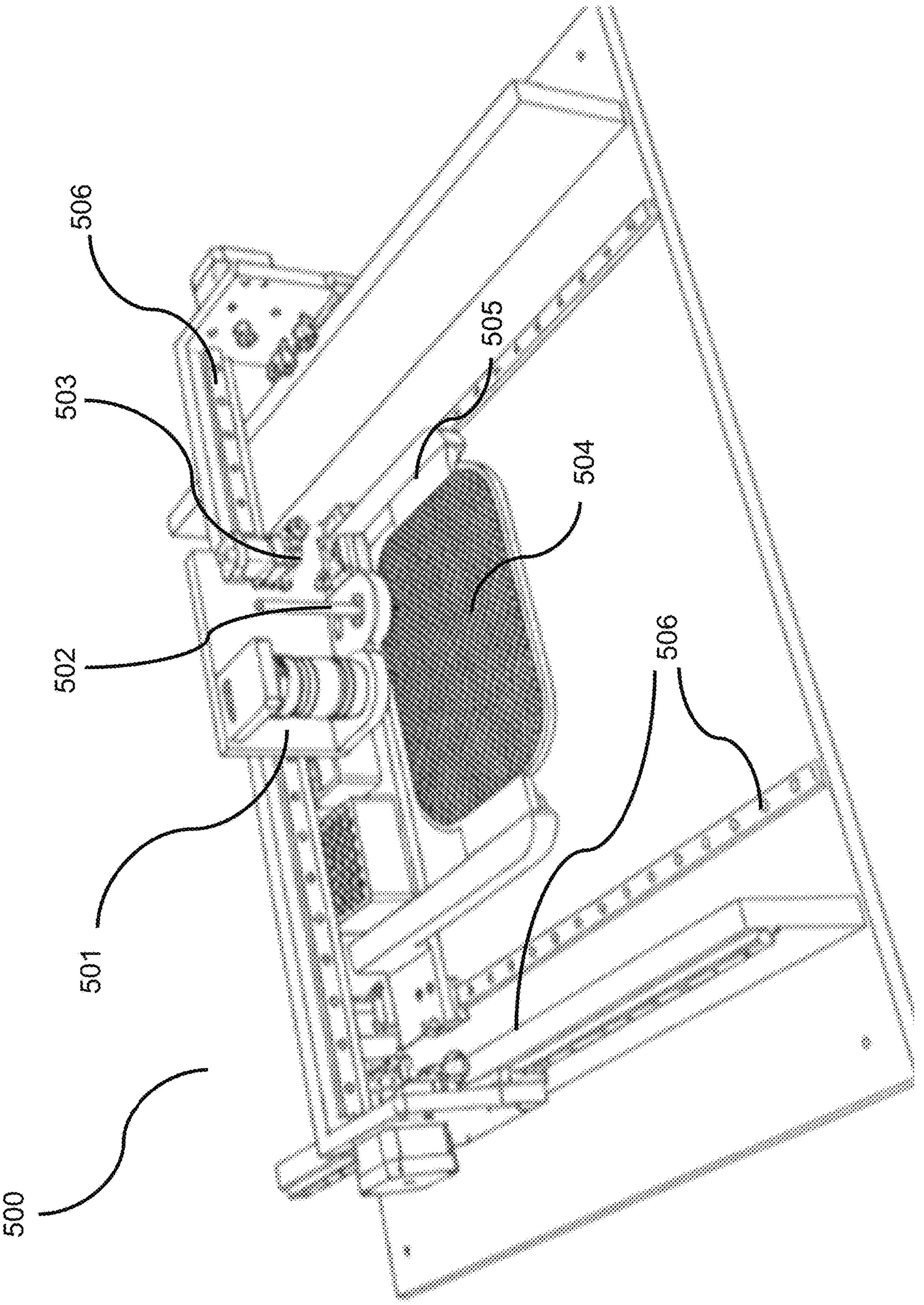
FIG. 5 shows a scanning system for quantifying the proportion of a marked material that is present in a product.

FIG. 5 shows a scanning system 500 for quantifying the proportion of a marked material that is present in a product. The system comprises a sample material holder 505 arranged to support a material sample 504, for example a portion of a fabric. The system also comprises a camera 501 for imaging luminescent markers present in material sample 504, a first spectrometer 502 for detecting the luminescent signal of luminescent markers present in the material sample 504, and a second spectrometer 503, for example a near-IR spectrometer, for identifying the overall composition of material 504. The spectrometers/camera 501, 502 and 503 are affixed to a motion control frame 505 configured for moving the spectrometers/camera 501, 502 and 503 across the surface of the material sample 504 on the sample material holder 505 so as to scan different portions of the material sample 504. In this way, the system 500 can simultaneously move spectrometers/camera 501, 502 and 503 over the surface to obtain a composite signal comprising data from the spectrometers/camera that varies with time/position on the material 504.

In certain examples a controller described herein may be configured to perform any of the methods, or particular steps of said methods described herein. A controller described herein may refer to a single controller and/or processor or control may be distributed between multiple controllers and/or processors. The activities and apparatus outlined herein may be implemented using controllers and/or processors which may be provided by fixed logic such as assemblies of logic gates or programmable logic such as software and/or computer program instructions executed by a processor. Other kinds of programmable logic include programmable processors, programmable digital logic (e.g., a field programmable gate array (FPGA), an erasable programmable read only memory (EPROM), an electrically erasable programmable read only memory (EEPROM)), an application specific integrated circuit, ASIC, or any other kind of digital logic, software, code, electronic instructions, flash memory, optical disks, CD-ROMs, DVD ROMs, magnetic or optical cards, other types of machine-readable mediums suitable for storing electronic instructions, or any suitable combination thereof.

The above embodiments are to be understood as illustrative examples. Further embodiments are envisaged. It is to be understood that any feature described in relation to any one embodiment may be used alone, or in combination with other features described, and may also be used in combination with one or more features of any other of the embodiments, or any combination of any other of the embodiments.

Furthermore, equivalents and modifications not described above may also be employed without departing from the scope of the invention, which is defined in the accompanying claims.

Other variations and modifications of the apparatus will be apparent to persons of skill in the art in the context of the present disclosure.

The invention claimed is:

1. A method of quantifying the proportion of a marked material that is present in a product, wherein the product comprises a mixture of one or more materials and the marked material is a material that has been marked with one or more luminescent markers, the method comprising scanning the product with a detector to collect a composite signal associated with the product, the composite signal including spectroscopic data associated with a luminescent signal of the one or more luminescent markers in the marked material and, by a controller communicatively coupled to the detector:

(i) obtaining, from the detector or from a computer memory, the composite signal associated with the product, the composite signal including the spectroscopic data collected from the product and associated with the luminescent signal of the one or more luminescent markers in the marked material;

(ii) identifying the marked material by the presence of a luminescent marker or combination of luminescent markers that are unique to the marked material based on spectroscopic data associated with the one or more luminescent markers and associating the product with a defined portion of the marked material, where a defined portion comprises a material from a particular location, producer or time frame;

(iii) based on spectroscopic data collected from the product, automatically selecting reference data associated with one or more reference materials comprising the marked material; and (iv) quantifying the proportion of the marked material that is present in the product based on said composite signal and said reference data, wherein the luminescent markers are present in the marked material in a known concentration that is associated with the identity of the marked material and providing an output indicating the presence of the marked material in the product and classifying a quantity of the marked material that is present in the product;

wherein the method further comprises obtaining by the controller, from the detector used to scan the product or from a computer memory, additional spectroscopic data associated with the product, different to spectroscopic data used in part (ii) and using said additional spectroscopic data for determining the overall material composition of the product or determining the identity and/or quantity of the one or more materials mixed with the marked material; and wherein the marked material comprises natural or synthetic fibres and the product is in the form of natural or synthetic fibres, yarn, woven or non-woven fabric made from synthetic or natural fibres;

or wherein the marked material comprises recycled plastic and the product is in the form of pellets, extruded materials, moulded materials or shredded or ground plastic material.

2. The method of claim 1, further comprising automatically uploading information corresponding to the quantified proportion of a marked material that is present in the product as an entry to a distributed ledger associated with the product, and/or where the quantified proportion deviates from an expected value, providing an alert signal to a user.

3. The method of claim 1, wherein the composite signal includes spectroscopic and/or imaging data collected from a plurality of different portions of the product.

4. The method of claim 1, comprising scanning the product using a handheld detector.

5. The method of claim 1, wherein obtaining a composite signal associated with the product comprises receiving the composite signal from a remote detector that is used to scan the product.

6. The method of claim 1, wherein the one or more luminescent markers comprise one or more inorganic luminescent compounds.

7. The method of claim 1, wherein the one or more materials mixed with the marked material include at least one of plastics or recycled plastics, and carbon black.

8. The method of claim 1, wherein the additional spectroscopic data comprises near-IR or Raman spectroscopic data.

9. The method of claim 1, wherein the quantifying step comprises comparing characteristics of said composite signal associated with the product to said one or more reference signals and, based on the comparison, quantifying the proportion of the marked material that is present in the product.

10. The method of claim 1, wherein the quantifying step comprises applying a pattern recognition or machine learning element associated with one or more reference signals collected from one or more respective reference materials to the composite signal to quantify the proportion of the marked material that is present in the product.

11. The method of claim 1, wherein the marked material comprises natural fibres, inorganic fibres, or a recycled material.

12. The method of claim 1, wherein the marked material comprises plastic or recycled plastic.

13. The method of claim 1, wherein quantifying the proportion of the marked material that is present in the product comprises indicating that the proportion falls within a range of values.

14. A system for quantifying the proportion of a marked material that is present in a product, wherein the product comprises a mixture of one or more materials and the marked material contains one or more luminescent markers, the system comprising:

a detector configured to collect a composite signal associated with the product, the composite signal including spectroscopic data associated with a luminescent signal of the one or more luminescent markers in the marked material;

a controller comprising a processor and computer memory, the controller communicatively coupled to the detector, the controller configured to obtain, from the detector or from the computer memory, a the composite signal associated with the product, the composite signal including the spectroscopic data collected from the product and associated with the luminescent signal of the one or more luminescent markers in the marked material;

wherein the controller is further configured to:

(i) identify the marked material by the presence of a luminescent marker or combination of luminescent markers that are unique to the marked material based on spectroscopic data associated with the one or more luminescent markers, and associate the product with a defined portion of the marked material, where a defined portion comprises a material from a particular location, producer or time frame;

(ii) based on spectroscopic data collected from the product, automatically select reference data associated with one or more reference materials comprising the marked material; and (iii) quantify the proportion of the marked material that is present in the product based on said composite signal and said reference data, wherein the luminescent markers are present in the marked material in a known concentration that is associated with the identity of the marked material and provide an output indicating the presence of the marked material in the product and classify a quantity of the marked material that is present in the product;

the controller further configured to obtain, from the detector or from the computer memory, additional spectroscopic data associated with the product, different to spectroscopic data used in part (i), and to use said additional spectroscopic to determine the overall material composition of the product or to determine the identity and/or quantity of the one or more materials mixed with the marked material, wherein the marked material comprises natural or synthetic fibers and the product is in the form of natural or synthetic fibers, yarn, woven or non-woven fabric made from synthetic or natural fibers;

or wherein the marked material comprises recycled plastic and the product is in the form of pellets, extruded materials, molded materials or shredded or ground plastic material.

15. The system of claim 14, wherein the detector is configured to provide the composite signal by scanning a plurality of different portions of the product to detect the one or more luminescent markers associated with the marked material.

16. The system of claim 14, wherein the detector is a handheld detector.

17. A handheld scanning system for obtaining spectroscopic data and imaging data from a product for quantifying the proportion of a marked material that is present in a product, wherein the product comprises a mixture of one or more materials and the marked material contains one or more luminescent markers, the system comprising:

a first spectrometer for detecting a luminescent signal of one or more luminescent markers present in the product;

a second spectrometer, comprising an IR spectrometer, for determining the identity and/or quantity of the one or more materials mixed with the marked material; and a controller comprising a processor and computer memory, the controller communicatively coupled to the first spectrometer and the second spectrometer, the controller configured to obtain, from the first spectrometer, spectroscopic data associated with the luminescent signal of the one or more luminescent markers in the marked material;

wherein the controller is further configured to:

(i) identify the marked material by the presence of a luminescent marker or combination of luminescent markers that are unique to the marked material based on spectroscopic data associated with the one or more luminescent markers, and associate the product with a defined portion of the marked material, where a defined portion comprises a material from a particular location, producer or time frame;

(ii) based on spectroscopic data collected from the product, automatically select reference data associated with one or more reference materials comprising the marked material; and (iii) quantify the proportion of the marked material that is present in the product based on said spectroscopic data and said reference data, wherein the luminescent markers are present in the marked material in a known concentration that is associated with the identity of the marked material and provide an output indicating the presence of the marked material in the product and classify a quantity of the marked material that is present in the product;

the controller further configured to obtain, from the second spectrometer, additional spectroscopic data associated with the product, different to spectroscopic data used in part (i), and to use said additional spectroscopic data to determine the overall material composition of the product or to determine the identity and/or quantity of the one or more materials mixed with the marked material, wherein the marked material comprises natural or synthetic fibers and the product is in the form of natural or synthetic fibers, yarn, woven or non-woven fabric made from synthetic or natural fibers; or wherein the marked material comprises recycled plastic and the product is in the form of pellets, extruded materials, molded materials or shredded or ground plastic material.

* * * * *